(12) United States Patent
McCann et al.

(10) Patent No.: US 11,600,194 B2
(45) Date of Patent: Mar. 7, 2023

(54) MULTITASK LEARNING AS QUESTION ANSWERING

(71) Applicant: salesforce.com, inc., San Francisco, CA (US)

(72) Inventors: Bryan McCann, Menlo Park, CA (US); Nitish Shirish Keskar, San Bruno, CA (US); Caiming Xiong, Mountain View, CA (US); Richard Socher, Menlo Park, CA (US)

(73) Assignee: Salesforce.com, Inc., San Francisco, CA (US)

( * ) Notice: Subject to any disclaimer, the term of this patent is extended or adjusted under 35 U.S.C. 154(b) by 1137 days.

(21) Appl. No.: 16/006,691

(22) Filed: Jun. 12, 2018

(65) Prior Publication Data

US 2019/0355270 A1    Nov. 21, 2019

Related U.S. Application Data

(60) Provisional application No. 62/673,606, filed on May 18, 2018.

(51) Int. Cl.
*G09B 7/02* (2006.01)
*G06F 16/9032* (2019.01)
(Continued)

(52) U.S. Cl.
CPC ............. *G09B 7/02* (2013.01); *G06F 16/345* (2019.01); *G06F 16/90332* (2019.01);
(Continued)

(58) Field of Classification Search
CPC ... G09B 7/02; G06F 16/345; G06F 16/90332; G06F 40/216; G06F 40/268;
(Continued)

(56) References Cited

U.S. PATENT DOCUMENTS 10,281,885 B1 * 5/2019 Chiu .................... G06N 3/0445
10,282,663 B2   5/2019 Socher et al.
(Continued)

FOREIGN PATENT DOCUMENTS

WO   WO 2018/085728    5/2018

OTHER PUBLICATIONS

Nam et al.; Dual Attention Networks for Multimodal Reasoning and Matching; Mar. 21, 2017; 2017 IEEE Conference on Computer Vision and Pattern Recognition (CVPR); pp. 1-9.*
(Continued)

*Primary Examiner* — Andrew R Dyer
(74) *Attorney, Agent, or Firm* — Haynes and Boone LLP

(57) ABSTRACT

Approaches for natural language processing include a multi-layer encoder for encoding words from a context and words from a question in parallel, a multi-layer decoder for decoding the encoded context and the encoded question, a pointer generator for generating distributions over the words from the context, the words from the question, and words in a vocabulary based on an output from the decoder, and a switch. The switch generates a weighting of the distributions over the words from the context, the words from the question, and the words in the vocabulary, generates a composite distribution based on the weighting of the distribution over the first words from the context, the distribution over the second words from the question, and the distribution over the words in the vocabulary, and selects words for inclusion in an answer using the composite distribution.

20 Claims, 10 Drawing Sheets

(51) Int. Cl.
*G06F 40/30* (2020.01)
*G06F 40/284* (2020.01)
*G06N 3/084* (2023.01)
*G06F 40/35* (2020.01)
*G06N 3/082* (2023.01)
*G06N 5/04* (2023.01)
*G06N 3/04* (2023.01)
*G06F 16/34* (2019.01)
*G06F 40/216* (2020.01)

(52) U.S. Cl.
CPC ............ *G06F 40/284* (2020.01); *G06F 40/30* (2020.01); *G06F 40/35* (2020.01); *G06N 3/0427* (2013.01); *G06N 3/0445* (2013.01); *G06N 3/0454* (2013.01); *G06N 3/0481* (2013.01); *G06N 3/082* (2013.01); *G06N 3/084* (2013.01); *G06N 5/041* (2013.01); *G06F 40/216* (2020.01)

(58) Field of Classification Search
CPC ........ G06F 40/284; G06F 40/30; G06F 40/35; G06N 3/0427; G06N 3/0445; G06N 3/0454; G06N 3/0481; G06N 3/082; G06N 3/084; G06N 5/041
USPC ..................................................... 707/17.015
See application file for complete search history.

(56) References Cited

U.S. PATENT DOCUMENTS

| | | | |
|---|---|---|---|
| 10,565,493 B2* | 2/2020 | Merity | G06N 3/0472 |
| 10,776,581 B2* | 9/2020 | McCann | G06F 16/3334 |
| 10,936,947 B1* | 3/2021 | Flunkert | G06N 3/0445 |
| 2011/0065082 A1* | 3/2011 | Gal | G09B 7/02 434/365 |
| 2014/0056511 A1* | 2/2014 | Lu | G06K 9/6256 382/225 |
| 2016/0350653 A1 | 12/2016 | Socher et al. | |
| 2017/0024645 A1 | 1/2017 | Socher et al. | |
| 2017/0032280 A1 | 2/2017 | Socher | |
| 2017/0046616 A1 | 2/2017 | Socher et al. | |
| 2017/0140240 A1 | 5/2017 | Socher et al. | |
| 2017/0316775 A1* | 11/2017 | Le | G06F 16/3329 |
| 2018/0082171 A1 | 3/2018 | Merity et al. | |
| 2018/0082184 A1* | 3/2018 | Guo | G06F 40/30 |
| 2018/0096219 A1 | 4/2018 | Socher | |
| 2018/0114108 A1* | 4/2018 | Lao | G06N 3/006 |
| 2018/0121785 A1* | 5/2018 | Min | G06N 3/006 |
| 2018/0121787 A1 | 5/2018 | Hashimoto et al. | |
| 2018/0121788 A1 | 5/2018 | Hashimoto et al. | |
| 2018/0121799 A1 | 5/2018 | Hashimoto et al. | |
| 2018/0129931 A1 | 5/2018 | Bradbury et al. | |
| 2018/0129937 A1 | 5/2018 | Bradbury et al. | |
| 2018/0129938 A1 | 5/2018 | Xiong et al. | |
| 2018/0137854 A1* | 5/2018 | Perez | G06F 40/35 |
| 2018/0143966 A1 | 5/2018 | Lu et al. | |
| 2018/0143978 A1* | 5/2018 | Chang | B60N 2/2806 |
| 2018/0144208 A1 | 5/2018 | Lu et al. | |
| 2018/0144248 A1 | 5/2018 | Lu et al. | |
| 2018/0247549 A1* | 8/2018 | Martin | G09B 19/00 |
| 2018/0329884 A1* | 11/2018 | Xiong | G06N 3/0445 |
| 2018/0336183 A1* | 11/2018 | Lee | G06N 5/022 |
| 2018/0365321 A1* | 12/2018 | Ke | G06N 3/0445 |
| 2019/0005021 A1* | 1/2019 | Miller | G10L 15/26 |
| 2019/0005090 A1* | 1/2019 | Zhang | G06F 40/30 |
| 2019/0043379 A1* | 2/2019 | Yuan | G09B 7/02 |
| 2019/0122101 A1* | 4/2019 | Lei | G06N 3/08 |
| 2019/0197154 A1* | 6/2019 | Cohen | G06F 16/583 |
| 2019/0228099 A1* | 7/2019 | Bajaj | G06N 3/08 |
| 2019/0287012 A1* | 9/2019 | Celikyilmaz | G06F 40/56 |
| 2020/0066262 A1* | 2/2020 | Shu | G10L 15/197 |
| 2021/0240931 A1* | 8/2021 | Farri | G16H 30/40 |

OTHER PUBLICATIONS

Sebastian Ruder; Deep Learning for NLP Best Practices; Jul. 25, 2017; ruder.io; pp. 1-25.*

Jiasen Lu, Jianwei Yang, Dhruv Batra, and Devi Parikh; Hierarchical question-image co-attention for visual question answering; 2016; In Proceedings of the 30th International Conference on Neural Information Processing Systems (NIPS'16); Curran Associates Inc., Red Hook, NY, USA; pp. 1-9.*

Dr. Shane Templeton; The Keys to Vocabulary: Word-Specific and Generative Instruction; Jul. 21, 2017; Houghton Mifflin Harcourt; pp. 1-9.*

Andrychowicz et al., "Learning to Learn by Gradient Descent by Gradient Descent," In the 30th Conference on Neural Information Processing Systems, Barcelona, Spain, Dec. 5-10, 2016, 9 pages.

Ba et al., "Layer normalization," arXiv:1607.06450v1, Jul. 21, 2016, 14 pages.

Bahdanau et al., "Neural Machine Translation by Jointly Learning to Align and Translate," Published as a Conference Paper at the International Conference on Learning Representation, 2015. pp. 1-15.

Bengio, et al., On the optimization of a synaptic learning rule. Optimality in Artificial and Biological Neural Networks, 1992, 29 pages.

Bengio, et al., "Curriculum learning," In Proceedings of the 26th International Conference on Machine Learning, Montreal, Canada, 2009, 8 pages.

Bowman et al., "A Large Annotated Corpus for Learning Natural Language Inference," In Proceedings of the 2015 Conference on Empirical Methods in Natural Language Processing, Lisbon, Portugal, Sep. 17-21, 2015, pp. 632-642.

Caruna, Rich, "Multitask learning," Machine Learning, vol. 28, Kluwer Academic Publishers, Boston, Manufactured in The Netherlands, 1997, pp. 41-75.

Cettolo et al., "The IWSLT 2016 Evaluation Campaign," In the 13th International Workshop on Spoken Language Translation (IWSLT), Seattle, USA, Dec. 8-9, 2016, 14 pages.

Chen, et al., "The Best of Both Worlds: Combining Recent Advances in Neural Machine Translation," arXiv:1804.09849, 2018, 12 pages.

Chen et al., "Natural Language Inference Models Enhanced with External Knowledge," arXiv:1711.04289, Nov. 12, 2017, 11 pages. (Accepted at the 56th Annual Meeting of the Association for Computational Linguistics, Melbourne, Australia, Jul. 15-20, 2018.).

Choi et al., "Learning To Compose Task-Specific Tree Structures," In Association for the Advancement of Artificial Intelligence, 2017, pp. 5094-5101.

Collobert et al., "A Unified Architecture for Natural Language Processing: Deep Neural Networks with Multitask Learning," In Proceedings of the 25th International Conference on Machine Learning, Helsinki, Finland (2008) pp. 1-8 (https://ronan.collobert.com/pub/matos/2008_nlp_icml.pdf).

Collobert et al., "Natural Language Processing (Almost) From Scratch," Journal of Machine Learning Research 12, 2011, pp. 2493-2537.

Condoravdi, et al., "Entailment, Intensionality and Text Understanding," Proceedings of the HLT-NAACL 2003 Workshop on Text Meaning, 2003, 8 pages.

Dagan et al., "The Pascal Recognising Textual Entailment Challenge," In Machine Learning Challenges Workshop (MLCW), 2005, pp. 177-190.

Deb et al., "Multi-Objective Optimization," In Search methodologies, pp. 403-449. Springer,2014.

Fernando et al., "Pathnet: Evolution channels gradient descent in super neural networks," arXiv preprint arXiv:1701.08734. Jan. 30, 2017. 16 pages.

Gehring et al., "Convolutional Sequence To Sequence Learning," Proceedings of the 34th International Conference on Machine Learning, Sydney, Australia, Aug. 6-11, 2017, 10 pages.

Ghaeini et al., DR-BILSTM: Dependent Reading Bidirectional LSTM for Natural Language Inference. ArXiv1802.05577, Apr. 11, 2018. 18 pages. (Accepted at The 16th Annual Conference of the North American Chapter of the Association for Computational

(56) References Cited

OTHER PUBLICATIONS

Linguistics (NAACL HLT), New Orleans, Louisiana, USA, Jun. 1-6, 2018.).
Grusky et al., "Newsroom: A dataset of 1.3 Million Summaries with Diverse Extractive Strategies," In Proceedings of NAACL-HLT, New Orleans, Louisiana, Jun. 1-6, 2018, pp. 708-719.
Gulcehre et al. "Pointing the Unknown Words," Proceedings of the 54th Annual Meeting of the Association for Computational Linguistics, vol. I: Long Papers, Berlin, Germany, Aug. 7-12, 2016. http://www.aclweb.org/anthology/P16-1014. pp. I 40-149.
He et al., "Deep Semantic Role Labeling: What works and What's Next," In Proceedings of the 55th Annual Meeting of the Association for Computational Linguistics, Vancouver, Canada, Jul. 30-Aug. 4, 2017, pp. 473-483. (https://doi.org/10.18653/v1/P17-1044).
He, et al., "Question-Answer Driven Semantic Role Labeling: Using Natural Language to Annotate Natural Language," In Proceedings of the 2015 Conference on Empirical Methods in Natural Language Processing, Lisbon, Portugal, Sep. 17-21, 2015, pp. 643-653.
Hermann et al., "Teaching Machines to Read and Comprehend," Neural Information Processing Systems (NIPS) Proceedings of the 28th International Conference on Neural Information Processing Systems, vol. 1. Montreal, Canada. Dec. 7-12, 2015. pp. 1-9.
Hochreiter et al., "Learning to Learn Using Gradient Descent," In International Conference on Artificial Neural Networks, Springer,2001, pp. 87-94.
Hovy, et al, "Ontonotes: The 90% Solution" Proceedings of the Human Language Technology Conference of the North American Chapter of the ACL, New York, Jun. 2006, pp. 57-60.
Hu et al., "Reinforced Mnemonic Reader for Machine Reading Comprehension," ArXiv:1705.02798, Jun. 6, 2018. 8 pages. (Accepted at The 2018 International Joint Conference on Artificial Intelligence, Stockholm, Sweden, Jul. 1319, 2018.).
Huang et al., "FusionNet: Fusing Via Fully-Aware Attention with Application to Machine Comprehension," Sixth International Conference on Learning Representations. Vancouver, Canada. Apr. 30-May 3, 2018. pp. 1-20.
Im et al., "Distance-Based Self-Attention Network for Natural Language Inference," ArXiv:1712.02047, 2017, 12 pages.
Johansson et al., "Dependency-Based Semantic Role Labeling of PropBank," In Proceedings of the 2008 Conference on Empirical Methods in Natural Language Processing, Honolulu, Hawaii, USA, Oct. 2008, pp. 69-78.
Joshi et al., "TriviaQA: A Large Scale Distantly Supervised Challenge Dataset for Reading Comprehension," Association for Computational Linguistics. Vancouver, Canada. Jul. 30-Aug. 4, 2017. pp. 1-11.
Kaiser et al., "One Model to Learn Them All," https://arxiv.org/pdf/1706.05137.pdf. pp. 1-10.
Kemker, et al., "Measuring Catastrophic Forgetting In Neural Networks," ArXiv:1708.02072, Nov. 9, 2017, 15 pages. (Accepted at The Thirty-Second AAAI Conference on Artificial Intelligence, New Orleans, Louisiana, USA, Feb. 2-7, 2018.).
Kiros, et al., "Skip-Thought Vectors," In Twenty-Ninth Conference on Neural Information Processing Systems, Montreal, Canada, Dec. 7-12, 2015, 9 pages.
Kotzias et al., "From Group to Individual Labels Using Deep Features," In Proceedings of the 21th ACM SIGKDD International Conference on Knowledge Discovery and Data Mining, 2015, pp. 597-606.
Levesque et al., "The Winograd Schema Challenge," In Papers from the AAAI 2011 Spring Symposium; Logical Formalizations of Commonsense Reasoning, 2011, pp. 63-68.
Levy et al., "Zero-Shot Relation Extraction Via Reading Comprehension," Proceedings of the 21st Conference on Computational Natural Language Learning (CoNLL 2017), Vancouver, Canada, Aug. 3-4, 2017, pp. 333-342.
Lin et al., "ROUGE: A Package for Automatic Evaluation of Summaries," In Text Summarization Branches out,"Proceedings of the Association for Computational Linguistics Workshop (vol. 8)," Barcelona, Spain. May 2-7, 2004. pp. 1-8.
Liu et al., "Phase Conductor on Multi-Layered Attentions For Machine Comprehension," ArXiv:1710.10504, Nov. 1, 2017, 10 pages.
Liu et al., "Stochastic Answer Networks For Machine Reading Comprehension," ArXiv:1712.03556, Dec. 10, 2017, 11 pages. (Accepted at the 56th Annual Meeting of the Association for Computational Linguistics, Melbourne, Australia, Jul. 15-20, 2018.).
Luong et al. "Multi-Task Sequence to Sequence Learning," Proceedings of the 4th International Conference on Learning Representation 2016. pp. 1-10.
Luong et al., "Effective Approaches to Attention-Based Neural Machine Translation," Proceedings of the 2015 Conference on Empirical Methods in Natural Language Processing, Lisbon, Portugal. Sep. 17-21, 2015. pp. 1-10.
Maccartney et al., "An Extended Model of Natural Logic," In Proceedings of the Eight International Conference on Computational Semantics, Tilburg, The Netherlands, Jan. 2009, pp. 140-156.
Mallya et al., "PackNet: Adding Multiple Tasks to a Single Network by Iterative Pruning," (Nov. 15, 2017 pp. 1-9 arXiv:1711.05769.
Marcheggiani et al., "A Simple And Accurate Syntax-Agnostic Neural Model For Dependency-Based Semantic Role Labeling," In Proceedings of the 21st Conference on Computational Natural Language Learning (CoNLL 2017), Vancouver, Canada, Aug. 3-4, 2017, pp. 411-420.
McCann et al., "Learned in Translation: Contextualized Word Vectors," in Advances in Neural Information Processing Systems (NIPS) (Aug. 1, 2017) pp. 6297-6307, pp. 1-11 arXiv:1708.00107.
McCloskey et al., "Catastrophic Interference in Connectionist Networks: The Sequential Learning Problem," In Psychology of learning and motivation, vol. 24. 1989. pp. 109-165.
Merity et al., "Pointer Sentinel Mixture Models," Published as a Conference paper at the International Conference on Learning Representations (ICLR). Sep. 26, 2016. https://arxiv.org/abs/1609.07843v1. pp. 1-13.
Mikolov et al., "Efficient Estimation of Word Representations In Vector Space," ArXiv:1301.3781, Sep. 7, 2013, 12 pages.
Mikolov et al., "Distributed Representations of Words and Phrases and Their Compositionality," In Advances in Neural Information Processing Systems 26 (NIPS), Lake Tahoe, California, USA, Dec. 5-10, 2013, 9 pages.
Min et al., "Question Answering through Transfer Learning from Large Fine-grained Supervision Data," Association for Computational Linguistics. Vancouver, Canada. Jul. 30-Aug. 4, 2017. pp. 1-8.
Mitchell et al. "The Need For Biases In Learning Generalizations," Rutgers University, New Brunswick, NJ, May 1980, 4 pages.
Nair et al., "Rectified Linear Units Improve Restricted Boltzmann Machines," Appearing in Proceedings of the 27 th International Conference on Machine Learning. Haifa, Israel. Jun. 21-24, 2010. pp. 1-8.
Nallapati et al., "Abstractive Text Summarization using Sequence-to-sequence RNNs and Beyond," Berlin, Germany. Aug. 11-12, 2016. pp. 1-12.
Pan et al., "MEMEN: Multi-Layer Embedding with Memory Networks for Machine Comprehension," arXiv preprint. arXiv: 1707.09098. Available Online at: https://arxiv.org/abs/1707.09098. Jul. 28, 2017. pp. 1-7.
Papineni et al., "BLEU: a Method for Automatic Evaluation of Machine Translation," Proceedings of the 40th Annual Meeting of the Association for Computational Linguistics (ACL), Philadelphia, (Jul. 2002) pp. 311-318, pp. 1-8 https://www.aclweb.org/anthology/P02-1040.pdf.
Pasunuru et al., "Multi-reward reinforced summarization with saliency and entailment," In Proceedings of the North American Chapter of the Association for Computational Linguistics: Human Language Technologies (NAACL-HLT), New Orleans, Louisiana. Jun. 1-6, 2018. pp. 646-653.

(56) References Cited

OTHER PUBLICATIONS

Pasunuru et al., "Towards Improving Abstractive Summarization Via Entailment Generation," In Proceedings of the Workshop on New Frontiers in Summarization, Copenhagen, Denmark, Sep. 7, 2017, pp. 27-32.
Paulus et al., "A Deep Reinforced Model for Abstractive Summerization," arxiv preprint arxiv:1705.04304. https://arxiv.org/abs/1705.04304. Nov. 16, 2017. pp. 1-12.
Peters et al., "Deep Contextualized Word Representations," ArXiv:1802.05365, Feb. 15, 2018, 15 pages.
Punyakanok et al., "The Importance of Syntactic Parsing and Inference in Semantic Role Labeling," Association for Computational Linguistics, vol. 6, No. 9, 2008, pp. 257-287.
Radford et al., "Learning to Generate Reviews and Discovering Sentiment," Cornell University Library, (Apr. 6, 2017) pp. 1-9 ArXiv:1704.01444.
Ramachandran et al., "Unsupervised Pretraining For Sequence to Learning," In Proceedings of the 2017 Conference on Empirical Methods in Natural Language Processing, Copenhagen, Denmark, Sep. 7-11, 2017, pp. 383-391.
Ratcliff, Roger "Connectionist Models of Recognition Memory: Constraints Imposed By Learning And Forgetting Functions," Psychological review, vol. 97, No. 2. 1990. pp. 285-308.
Ruder et al., "Sluice Networks: Learning What To Share Between Loosely Related Tasks," ArXiv:1705.08142, May 23, 2017, 10 pages. (Accepted at the Thirty-Third AAAI Conference on Artificial Intelligence, Honolulu, Hawaii, USA, Jan. 27-Feb. 1, 2019.).
Salant et al., "Contextualized Word Representations for Reading Comprehension," ArXiv:1712.03609, Dec. 10, 2017, 6 pages.
Santoro et al., "Meta-Learning with Memory-Augmented Neural Networks," In Proceedings of the 33rd International Conference on Machine Learning, New York, NY, USA, 2016 pp. 1842-1850.
See et al., "Get To The Point: Summarization with Pointer-Generator Networks," Proceedings of the 55th Annual Meeting of the Association for Computational Linguistics (vol. 1: Long Papers), http://aclweb.org/anthology/P17-1099. Apr. 14, 2017. pp. 1-20.
Sennrich et al., "The University of Edinburgh's Neural MT Systems for WMT17," In Proceedings of the Conference on Machine Translation (WMT), vol. 2: Shared Task Papers, Copenhagen, Denmark, Sep. 7-11, 2017, pp. 389-399.
Seo et al., "Bidirectional Attention Flow for Machine Comprehension," Published as a Conference Paper at the International Conference on Learning Representations (ICLR). Feb. 24, 2017. pp. 1-13.
Socher et al., "Recursive Deep Models for Semantic Compositionality Over a Sentiment Treebank," Proceedings of the 2013 Conference on Empirical Methods in Natural Language Processing, Seattle, Washington, USA, Association for Computational Linguistics (Oct. 18-21, 2013) pp. 1631-1642 pp. 1-12. (http://www.aclweb.org/anthology/D13-1170).
Sutskever et al., "Sequence to Sequence Learning with Neural Networks," Advances in Neural Information Processing Systems. Dec. 14, 2014. pp. 1-9 arXiv:1409.3215.
Suzuki, et al., "Cutting-Off Redundant Repeating Generations For Neural Abstractive Summarization," In Proceedings of the 15th Conference of the European Chapter of the Association for Computational Linguistics (EACL), vol. 2, Short Papers, Apr. 2017, pp. 291-297.
Tan et al., "Deep Semantic Role Labeling with Self-Attention," ArXiv:1712.01586, Dec. 5, 2017, 8 pages. (Accepted at The Thirty-Second AAAI Conference on Artificial Intelligence, New Orleans, Louisiana, Feb. 2-7, 2018.).
Tay et al., "A Compare-Propagate Architecture with Alignment Factorization For Natural Language Inference," ArXiv:1801.00102, Dec. 30, 2017, 10 pages. (Accepted at The Conference on Empirical Methods in Natural Language Processing, Brussels, Belgium, Oct. 31-Nov. 4, 2018.).
Thrun et al., "Lifelong Learning Algorithms," In Learning to learn, Springer, 1998, pp. 181-209.
Thrun et al., Learning to Learn: Introduction And Overview, In Learning to learn, Springer, 1998, pp. 3-17.
Vaswani et al., "Attention is All You Need," 31st Conference on Neural Information Processing Systems (NIPS 2017). Long Beach, CA. Dec. 4-9, 2017. pp. 1-15.
Wang et al., "Bilateral Multi-Perspective Matching for Natural Language Sentences," ArXiv: 1702.03814, Jul. 14, 2017, 7 pages.
Williams et al., "A Broad-Coverage Challenge Corpus For Sentence Understanding Through Inference," ArXiv:1704.05426, Apr. 18, 2017, 10 pages. (Accepted at The Conference of the North American Chapter of the Association for Computational Linguistics: Human Language Technologies, New Orleans, Louisiana, Jun. 1-6, 2018.).
Winograd et al. "Understanding Natural Language," Cognitive psychology, vol. 3, Issue Jan. 1, 1972, pp. 1-191.
Wu et al., Google's Neural Machine Translation System: Bridging the Gap Between Human, ArXiv:1609.08144, Oct. 8, 2016, 23 pages.
Xiong et al., "Dynamic Memory Networks for Visual and Textual Question Answering," Proceedings of the 33rd International Conference on Machine Learning, New York, NY, USA. JMLR: W&CP vol. 48 (Mar. 4, 2016) pp. 1-10 arXiv:1603.01417v1.
Xiong et al., "Dynamic Coattention Networks for Question Answering," Published as a Conference Paper at the International Conference on Learning Representations. Toulon, France. Apr. 24-26, 2017. pp. 1-14.
Xiong et al., "DCN+: Mixed Objective and Deep Residual Coattention for Question Answering," Conference Paper at the International Conference on Learning Representations. Vancouver, Canada. Apr. 30-May 3, 2018. pp. 1-10.
Yu et al., "Neural Semantic Encoders," Proceedings of the 15th Conference of the European Chapter of the Association for Computational Linguistics: vol. 1, Long Papers, Valencia, Spain, Apr. 3-7, 2017, pp. 397-407.
Yu et al., "Neural Tree Indexers for Text Understanding," Proceedings of the 15th Conference of the European Chapter of the Association for Computational Linguistics, vol. 1, Long Papers, Valencia, Spain, Apr. 3-7, 2017, pp. 11-21.
Zhong et al., "Seq2sql: Generating Structured Queries from Natural Language Using Reinforcement Learning," ArXiv:1709.00103, Nov. 9, 2017, 12 pages.
Zhou et al., "End-To-End Learning of Semantic Role Labeling Using Recurrent Neural Networks," In Proceedings of the 53rd Annual Meeting of the Association for Computational Linguistics and the 7th International Joint Conference on Natural Language Processing, Beijing, China, Jul. 26-31, 2015, pp. 1127-1137.
Zoph et al., "Transfer Learning for Low-Resource Neural Machine Translation," In Proceedings of the 2016 Conference on Empirical Methods in Natural Language Processing, Austin, Texas, Nov. 1-5, 2016, pp. 1568-1575.
Kirkpatrick et al., "Overcoming Catastrophic Forgetting In Neural Networks," Proceedings of the National Academy of Sciences, vol. 114, No. 13, Mar. 28, 2017, pp. 3521-3526.
Wen et al., "A Network-based End To End Trainable Task Oriented Dialogue System." Cambridge University Engineering Department, Trumpington Street, Cambridge, CB2 1PZ, UK. Apr. 24, 2017. pp. 1-12.
Shizhu He et al.: "Generating Natural Answers by Incorporating Copying and Retrieving Mechanisms in Sequence-to-Sequence Learning", Proceedings of the 55th Annual Meeting of the Association for Computational Linguistics (vol. 1: Long Papers), Jul. 30, 2017 (Jul. 30, 2017), pp. 199-208, XP055609663, Stroudsburg, PA, USA, DOI: 10.18653/v1/P17-1019, sections 1-3; figures 1, 2.
Rajarshee Mitra: "An abstractive approach to question answering", arxiv.org, arXiv:1711.06238v1 [cs.CL] Nov. 16, 2017 (Nov. 16, 2017), XP055609635, Retrieved from the internet: URL:https://arxiv.org/pdf/1711.06238v1.pdf [retrieved on Jul. 30, 2019], sections 1-3; figure 1.
Linfeng Song et al: "A Unified Query-based Generative Model for Question Generation and Question Answering", Arxiv.org, Cornell University Library, 201 Olin Library Cornell University, Ithaca, NY 14853, Sep. 4, 2017 (Sep. 4, 2017), XP080818294, section "Model", in particular "LSTM Decoder"; figure 1.

(56) References Cited

OTHER PUBLICATIONS

Pentina Anastasia et al: "Curriculum learning of multiple tasks", 2015 IEEE Conference on Computer Vision and Pattern Recognition (CVPR), IEEE, Jun. 7, 2015 (Jun. 7, 2015), pp. 5492-5500, XP032794019, DOI: 10.1109/CVPR.2015.7299188, [retrieved on Oct. 14, 2015], abstract, sections 1-3.

Cao Liu et al: "Curriculum Learning for Natural Answer Generation", Proceedings of the Twenty-Seventh International Joint Conference on Arlilicial Intelligence, Jul. 13, 2018 (Jul. 13, 2018), pp. 4223-4229, XP055609675, California, DOI: 10.24963/ijcai.2018/587, ISBN: 978-0-9992411-2-7, Sections 1, 2.

Fei Sun et al.: "Multi-Source Pointer Network for Product Title Summarization", Information and Knowledge Management, ACM, 2 Penn Plaza, Suite 701 New York, NY 10121-0701 USA, Oct. 17, 2018 (Oct. 17, 2018), pp. 7-16, XP058420201, DOI: 10.1145/3269206.3271722, ISBN: 978-1-4503-6014-2, Section 2.2.

International Search Report and Written Opinion dated Aug. 5, 2019 issued in related PCT App. No. PCT/US2019/032207 (19 pages).

Bos et al., "Recognising Textual Entailment with Robust Logical Inference," In Machine Learning Challenges. Evaluating Predictive Uncertainty, MLCW 2005. Lecture Notes in Computer Science, vol. 3944, pp. 404-426, (https://doi. org/10.1007/11736790_23).

Finn et al., "Model-agnostic meta-learning for fast adaptation of deep networks," Proceedings of the 34th International Conference on Machine Learning, Sydney, Australia, Aug. 6-11, 2017, pp. 1126-1135. (URL http://proceedings.mlr. press/v70/finnl7a.html).

Gepperth et al., "A Bio-Inspired Incremental Learning Architecture for Applied Perceptual Problems," Cognitive Computation, Springer 8, Dec. 16, 2016, 12 pages (https://hal.archives-ouvertes.fr/hal-01418123/document).

Graves et al., "Framewise Phoneme Classification with Bidirectional LSTM and Other Neural Network Architectures," Proceedings of the International Joint Conference on Neural Networks (IJCNN) 2005. vol. 18. (2005). pp. 602-610.

Gu et al., "Incorporating Copying Mechanism in Sequence-to-Sequence Learning," Proceedings of the 54th Annual Meeting of the Association for Computational Linguistics. Berlin, Germany. Aug. 7-12, 2016. pp. 1631-1640.

Hashimoto et al., "A Joint Many-Task Model: Growing a Neural Network for Multiple NLP Tasks," Proceedings of the 2017 Conference on Empirical Methods in Natural Language Processing: Association for Computational Linguistics, Copenhagen, Denmark. Sep. 7-11, 2017. pp. 1923-1933.

Hochreiter et al., "Long Short-Term Memory," Massachusetts Institute of Technology, Neural Computation, vol. 9, (1997), pp. 1735-1780.

Johnson et al., "Google's Multilingual Neural Machine Translation System: Enabling Zero-Shot Translation," Transactions of the Association for Computational Linguistics, vol. 5. Association for Computational Linguistics. Oct. 1, 2017. pp. 339-351.

Kumar et al. "Ask Me Anything: Dynamic Memory Networks for Natural Language Processing," Proceedings of The 33rd International Conference on Machine Learning (PMLR) vol. 48 (Mar. 5, 2016), 10 pages, ArXiv:1506.07285v5.

Lee et al., "Overcoming Catastrophic Forgetting by Incremental Moment Matching," Advances in Neural Information Processing Systems, 31st Conference on Neural Information Processing Systems (NIPS 2017), Long Beach, CA, USA, (Mar. 24, 2017) pp. 1-16, arXiv:1703.08475v3.

McCann et al: "The Natural Language Decathlon: Multitask Learning as Question Answering", Arxiv.org, Cornell University Library, 201 Olin Library Cornell University, Ithaca, NY 14853, Jun. 20, 2018 {2018-06-20), XP080893587, pp. 1-23.

Pennington et al., "GloVe: Global Vectors for Word Representation", Proceedings of the 2014 Conference on Empirical Methods in Natural Language Processing (EMNLP), Doha, Qatar (Oct. 25-29, 2014) pp. 1532-1543, https://nlp.stanford.edu/pubs/glove.pdf.

Rajpurkar et al., "SQuAD: 100,000+ Questions for Machine Comprehension of Text," Proceedings of the 2016 Conference on Empirical Methods in Natural Language Processing. Austin, Texas. Nov. 1-5, 2016. pp. 2383-2392.

Robins, Anthony, "Catastrophic Forgetting. Rehearsal and Pseudorehearsal," Connection Science, 7(2): 123-146. 1995. 37 pages.

Schmidhuber et al., "Learning to Control Fast-Weight Memories: An Alternative to Dynamic Recurrent Networks," Neural Computation, vol. 4(1), 1992, pp. 1-9.

Schmidhuber, "Evolutionary Principles in Self-Referential Learning," (Diploma Thesis), 1987, pp. 1-62.

Shen et al., "Reinforced Self-Attention Network: A Hybrid of Hard and Soft Attention For Sequence Modeling," ArXiv:1801.10296, Jan. 31, 2018. (Accepted at the 27th International Joint Conference on Artificial Intelligence and the 23rd European Conference on Artificial Intelligence, Stockholm, Sweden, Jul. 13-19, 2018.), 12 pages.

Tai et al., "Improved Semantic Representations from Tree-Structured Long Short-Term Memory Networks," Proceedings of the 53rd Annual Meeting of the Association for Computational Linguistics and the 7th International Join! Conference on Natural Language Processing. Beijing, China. Jul. 26-31, 2015. pp. 1556-1566.

Trischler et al., "NewsQA: A Machine Comprehension Dataset," Proceedings of the 2nd Workshop on Representation Learning for Natural Language Processing. Vancouver, Canada. Aug. 3, 2017. pp. 191-200.

Vilalta et al. "A Perspective View and Survey of Meta-Learning," Artificial Intelligence Jun. 2002, pp. 77-95.

Vinyals et al., "*Pointer Networks*" In Advances in Neural Information Processing Systems 28, Montreal, Canada, Dec. 7-12, 2015. http://papers.nips.cc/paper/5866-pointer-networks.pdf. pp. 1-9.

Wang et al., "Gated Self-Matching Networks for Reading Comprehension and Question Answering," Proceedings of the 55th Annual Meeting of the Association for Computational Linguistics. Vancouver, Canada. Jul. 30-Aug. 4, 2017. pp. 189-198.

Wang et al., "Machine Comprehension Using Match-LSTM and Answer Pointer." International Conference on Learning Representations, Toulon, France. Research Collection School of Information Systems. (Apr. 24-26, 2017) pp. 1-15.

Weissenborn et al., "Making Neural QA as Simple as Possible but not Simpler," Proceedings of the 21st Conference on Computational Natural Language Learning. Vancouver, Canada. Aug. 3-4, 2017. pp. 271-280.

Xiong et al., "DCN+: Mixed Objective and Deep Residual Coattention for Question Answering," arxiv.org, arXiv:1711.00106v2[csCL] Nov. 10, 2017 (Nov. 10, 2017), XP055541783, Retrieved from the internet URL:https://arxiv.org/pdf/1711.00106v2.pdf [retrieved on Jan. 1, 2019], pp. 1-10.

Yu et al., "End-to-End Answer Chunk Extraction and Ranking for Reading Comprehension," ArXiv:1610.09996, Nov. 2, 2016, 7 pages.

Yu et al., "Qanet: Combining Local Convolution with Global Self-Attention for Reading Comprehension", 2018, pp. 1-16.

\* cited by examiner

| | Question | Context | Answer |
|---|---|---|---|
| 105 | To whom did the Virgin Mary appear? | ...the Virgin Mary reputedly appeared to Saint Bernadette Soubirous... | Saint Bernadette Soubirous |
| 110 | What is the translation from English to German? | Most of the planet is ocean water. | Der Großteil der Erde ist Meerwasser |
| 115 | What is the summary? | Harry Potter star Daniel Radcliffe gains access to a reported £320 million fortune... | Harry Potter star Daniel Radcliffe gets £320M fortune... |
| 120 | Hypothesis: Product and geography are what make cream skimming work. Entailment, neutral, or contradiction? | Premise: Conceptually cream skimming has two basic dimensions — product and geography. | Entailment |
| 125 | Is this sentence positive or negative? | A stirring, funny and finally transporting re-imagining of Beauty and the Beast and 1930s horror film. | positive |

| | Question | Context | Answer |
|---|---|---|---|
| 130 | What rows? | There are four boat clubs that row on the River Dee:... | four boat clubs |
| 135 | What was the title that Timur held? | Both Timur and Demir are popular male names in Turkey today. | unanswerable |
| 140 | What information have you gathered about the user? | Are there any Eritrean restaurants in town? | food: Eritrean |
| 145 | What is the translation from English to SQL? | The table has column names... Tell me what the notes are for South Australia | SELECT notes from table WHERE 'Current Slogan' = 'South Australia' |
| 150 | Who had given help? Susan or Joan? | Joan made sure to thank Susan for all the help she had given. | Susan |

FIG. 1

| Task | Dataset | # Train | # Dev | # Test | Metric |
|---|---|---|---|---|---|
| Question Answering | SQuAD | 87599 | 10570 | 9616 | nF1 |
| Machine Translation | IWSLT | 196884 | 993 | 1305 | BLEU |
| Summarization | CNN/DM | 287227 | 13368 | 11490 | ROUGE |
| Natural Language Inference | MNLI | 392702 | 20000 | 20000 | nF1 |
| Sentiment Analysis | SST | 6920 | 872 | 1821 | nF1 |
| Semantic Role Labeling | QA-SRL | 6414 | 2183 | 2201 | nF1 |
| Zero-Shot Relation Extraction | QA-ZRE | 840000 | 600 | 12000 | F1 |
| Goal-Oriented Dialogue | WOZ | 2536 | 830 | 1646 | EM |
| Database Query Generation | WikiSQL | 56355 | 8421 | 15878 | EM |
| Pronoun Resolution | MWSC | 80 | 82 | 100 | nF1 |

*FIG. 8*

| Dataset | Fully Joint | Curriculum | Anti-Curriculum SQuAD | +IWSLT+CNN/DM | +MNLI |
|---|---|---|---|---|---|
| SQuAD | 70.8 | 43.4 | 74.3 | 74.5 | 74.6 |
| IWSLT | 16.1 | 4.3 | 13.7 | 18.7 | 19.0 |
| CNN/DM | 23.9 | 21.3 | 24.6 | 20.8 | 21.6 |
| MNLI | 70.5 | 58.9 | 69.2 | 69.6 | 72.7 |
| SST | 86.2 | 84.5 | 86.4 | 83.6 | 86.8 |
| QA-SRL | 75.8 | 70.6 | 77.6 | 77.5 | 75.1 |
| QA-ZRE | 28.0 | 24.6 | 34.7 | 30.1 | 37.7 |
| WOZ | 80.6 | 81.9 | 84.1 | 81.7 | 85.6 |
| WikiSQL | 62.0 | 68.6 | 58.7 | 54.8 | 42.6 |
| MWSC | 48.8 | 41.5 | 48.4 | 34.9 | 41.5 |
| decaScore | 562.7 | 499.6 | 571.7 | 546.2 | 557.2 |

*FIG. 10*

| Dataset | Single-task Training | | | | Multitask Training | | | | |
|---|---|---|---|---|---|---|---|---|---|
| | S2S | w/SAtt | +CAtt | +QPtr | S2S | w/SAtt | +CAtt | +QPtr | +ACurr |
| SQuAD | 48.2 | 68.2 | 74.6 | 75.5 | 47.5 | 66.8 | 71.8 | 70.8 | 74.3 |
| IWSLT | 25.0 | 23.3 | 26.0 | 25.5 | 14.2 | 13.6 | 9.0 | 16.1 | 13.7 |
| CNN/DM | 19.0 | 20.0 | 25.1 | 24.0 | 25.7 | 14.0 | 15.7 | 23.9 | 24.6 |
| MNLI | 67.5 | 68.5 | 34.7 | 72.8 | 60.9 | 69.0 | 70.4 | 70.5 | 69.2 |
| SST | 86.4 | 86.8 | 86.2 | 88.1 | 85.9 | 84.7 | 86.5 | 86.2 | 86.4 |
| QA-SRL | 63.5 | 67.8 | 74.8 | 75.2 | 68.7 | 75.1 | 76.1 | 75.8 | 77.6 |
| QA-ZRE | 20.0 | 19.9 | 16.6 | 15.6 | 28.5 | 31.7 | 28.5 | 28.0 | 34.7 |
| WOZ | 85.3 | 86.0 | 86.5 | 84.4 | 84.0 | 82.8 | 75.1 | 80.6 | 84.1 |
| WikiSQL | 60.0 | 72.4 | 72.3 | 72.6 | 45.8 | 64.8 | 62.9 | 62.0 | 58.7 |
| MWSC | 43.9 | 46.3 | 40.4 | 52.4 | 52.4 | 43.9 | 37.8 | 48.8 | 48.4 |
| decaScore | - | - | - | - | 473.6 | 546.4 | 533.8 | 562.7 | 571.7 |

MULTITASK LEARNING AS QUESTION ANSWERING

RELATED APPLICATIONS

The present application claims priority to U.S. Provisional Patent Application No. 62/673,606, filed May 18, 2017, entitled "Multitask Learning As Question Answering," which is hereby incorporated by reference in its entirety.

TECHNICAL FIELD

The present disclosure relates generally to natural language processing and more specifically to answering natural language questions about a natural language context.

BACKGROUND

Natural language processing and the ability of a system to answer natural language questions about the content of a natural language sample is a benchmark to test for context-specific reasoning about information provided in natural language form. This can be a complex task because there are many different types of natural language questions that can be asked and whose answering may require different types of reasoning and/or different types of analysis.

Accordingly, it would be advantageous to have unified systems and methods for simultaneously being able to answer different kinds of natural language questions.

BRIEF DESCRIPTION OF THE DRAWINGS

FIG. 1 is a simplified diagram of examples of natural language processing task types characterized as question answering according to some embodiments.

FIG. 8 is a simplified diagram of a summary of training sets according to some embodiments.

FIG. 10 is a simplified diagram of results for different training strategies according to some embodiments.

Figure 2:
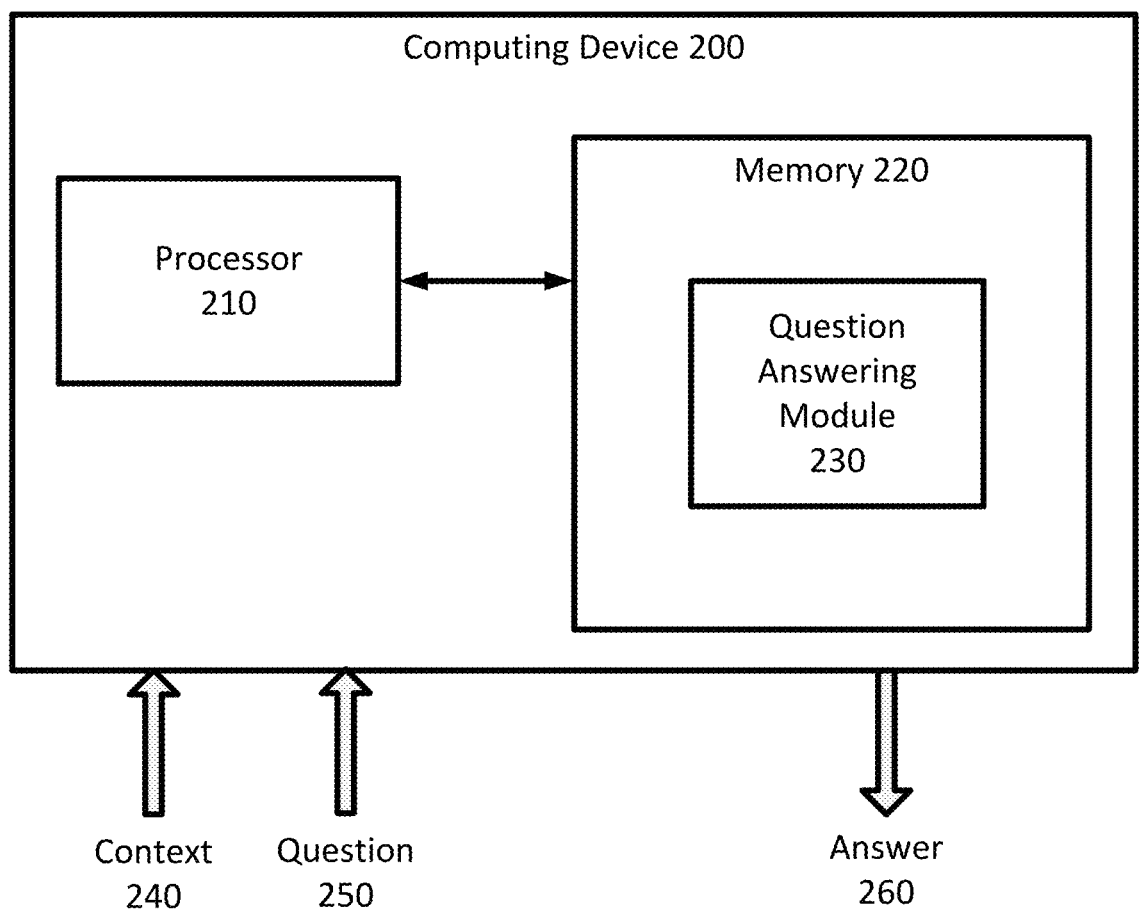
FIG. 2 is a simplified diagram of a computing device according to some embodiments.

In the figures, elements having the same designations have the same or similar functions.

DETAILED DESCRIPTION

Context specific reasoning, including context specific reasoning regarding the content of natural language information, is an important problem in machine intelligence and learning applications. Context specific reasoning may provide valuable information for use in the interpretation of natural language text and can include different tasks, such as answering questions about the content of natural language text, language translation, semantic context analysis, and/or the like. However, each of these different types of natural language processing tasks often involve different types of analysis and/or different types of expected responses.

Multitask learning in natural language processing has made progress when the task types are similar. However, when tackling different types of tasks, such as language translation, question answering and classification, parameter sharing is often limited to word vectors or subsets of parameters. The final architectures are typically highly optimized and engineered for each task type, limiting their ability to generalize across task types.

However, many of these task types can be handled by the same architecture and model when framed as a single type of task. For example, it is possible to treat many, if not all, natural language processing tasks as question answering tasks. For example, the task types of question answering, machine translation, document summarization, database query generation, sentiment analysis, natural language inference, semantic role labeling, relation extraction, goal oriented dialogue, and pronoun resolution may be framed as question answering tasks. FIG. 1 is a simplified diagram of examples of natural language processing task types characterized as question answering according to some embodiments. Each of the examples in FIG. 1 is shown in three column format with a question, a context, and a ground truth answer. Example 105 is an example of a question answering task where a question is asked about the content of a context. Example 110 is an example of a machine translation task from English to German where the question is posed in the form "what is the translation . . . ." Example 115 is an example of a document summarization task where the question is posed as "what is the summary?" Example 120 is an example of a natural language inference task where the question is posed using a hypothesis and a query as to whether the hypothesis entails, contradicts, or is neutral to the context. Example 125 is an example of a sentiment analysis task where the question is posed as to whether the context is positive or negative. Example 130 is an example of a semantic role labeling task where the question is posed as which entity plays an indicated role in the context. Example 135 is an example of a relation extraction task where the question is posed about the relationship of one of the entities mentioned in the context. Example 140 is an example of a goal oriented dialog task where the question is posed about knowledge that may be learned from the context. Example 145 is an example of a database query generation task where the question asks for a translation to a database query language (e.g., SQL). Example 150 is an example of a pronoun resolution task where the question is directed to answering a question about a pronoun appearing in the context.

FIG. 2 is a simplified diagram of a computing device 200 according to some embodiments. As shown in FIG. 2, computing device 200 includes a processor 210 coupled to memory 220. Operation of computing device 200 is controlled by processor 210. And although computing device 200 is shown with only one processor 210, it is understood that processor 210 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 200. Computing device 200 may be implemented as a stand-alone subsystem, as a board added to a computing device, and/or as a virtual machine.

Memory 220 may be used to store software executed by computing device 200 and/or one or more data structures used during operation of computing device 200. Memory 220 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 210 and/or memory 220 may be arranged in any suitable physical arrangement. In some embodiments, processor 210 and/or memory 220 may be implemented on a same board, in a same package (e.g., system-in-package), on a same chip (e.g., system-on-chip), and/or the like. In some embodiments, processor 210 and/or memory 220 may include distributed, virtualized, and/or containerized computing resources. Consistent with such embodiments, processor 210 and/or memory 220 may be located in one or more data centers and/or cloud computing facilities.

As shown, memory 220 includes a question answering module 230 that may be used to implement and/or emulate the question answering systems and models described further herein and/or to implement any of the methods described further herein. In some examples, question answering module 230 may be used to answer natural language questions about natural language contexts. In some examples, question answering module 230 may also handle the iterative training and/or evaluation of a question answering system or model used to answer natural language questions about natural language contexts. In some examples, memory 220 may include non-transitory, tangible, machine readable media that includes executable code that when run by one or more processors (e.g., processor 210) may cause the one or more processors to perform the counting methods described in further detail herein. In some examples, question answering module 230 may be implemented using hardware, software, and/or a combination of hardware and software. As shown, computing device 200 receives a natural language context 240 and a natural language question 250 about natural language context 240, which are provided to question answering module 230, question answering module 230 then generates a natural language answer 260 to natural language question 250 based on the content of natural language context 240.

Figure 3:
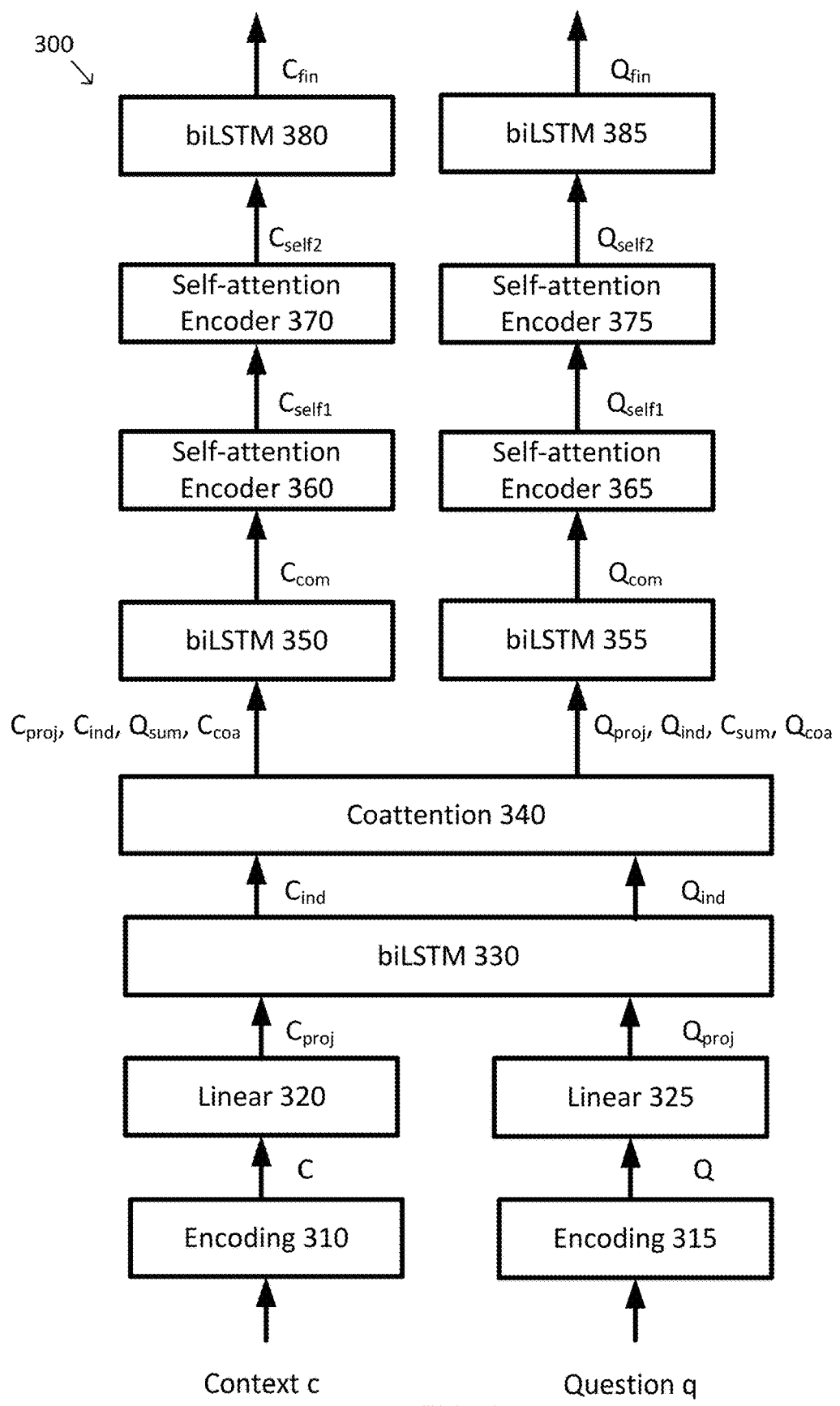
FIG. 3 is a simplified diagram of an encoder according to some embodiments.

FIG. 3 is a simplified diagram of an encoder 300 according to some embodiments. Encoder 300 receives a natural language context c and a natural language question q, which each consist of a sequence of ordered words in a natural language, such as English, French, German, Spanish, and/or the like. Both the context c and the question q are encoded using respective encoding layers 310 and 315 into matrix form where the ith row of the matrix corresponds to a $d_{emb}$-dimensional embedding for the ith token or word in the sequence as indicated according to Equation 1, where 1 corresponds to the number of words or tokens in the context and m corresponds to the number of words or tokens in the question. In some examples, the encoding of each word is based on the GloVe encodings where each word is encoded as an element of $\mathbb{R}^{300}$. In some examples, the encoding of each word is based on the character n-gram encodings where each word is encoded as an element of $\mathbb{R}^{100}$. In some example, the encoding of each word is based on a concatenation of GloVe and character n-gram encodings. In some examples, when there is no GloVe and/or character n-gram encoding for a word (e.g., the word is not in English), a random encoding is selected from a Normal distribution having a mean and standard deviation that is the same as the GloVe encodings (e.g., mean of zero and standard deviation of 0.4), with the same random encoding used consistently for each occurrence of the respective word. In some examples, when there is no GloVe and/or character n-gram encoding for a word (e.g., the word is not in English) a value of zero is used. In some examples, during training, the ground truth answer is encoded similarly as also shown in Equation 1, where n corresponds to the number of words or tokens in the ground truth answer.

$$C \in \mathbb{R}^{l \times d_{emb}}$$

$$Q \in \mathbb{R}^{m \times d_{emb}}$$

$$A \in \mathbb{R}^{n \times d_{emb}} \quad \text{Equation 1}$$

Independent Representations In some examples, independent representations $C_{proj}$ and $Q_{proj}$ for the encoded context and question, respectively, are generated using respective linear networks 320 and 325 according to Equation 2. In some examples, the respective linear networks 320 and 325 may also reduce the dimensionality of the encoded context and question to d. In some examples, the dimensionality d is 200. As shown in Equation 2, both of linear networks 320 and 325 use a same weight matrix $W_1$ and a same bias $b_1$ so the independent representations $C_{proj}$ and $Q_{proj}$ are projected onto the d dimensional space consistently. In some examples, the bias $b_1$ is optional and may be omitted. In some examples, weight matrix $W_1$ and bias $b_1$ are trained along with the rest of encoder 300.

$$CW_1 + b_1 = C_{proj} \in \mathbb{R}^{l \times d}$$

$$QW_1 + b_1 = Q_{proj} \in \mathbb{R}^{m \times d} \quad \text{Equation 2}$$

The projected representations for the context, $C_{proj}$, and the question, $Q_{proj}$, are passed to a shared, one-layer bidirectional Long Short-Term Memory Network (BiLSTM) 330 to form $C_{ind}$ and $Q_{ind}$ according to Equation 3.

$$\text{BiSTM}(C_{proj}) = C_{ind} \in \mathbb{R}^{l \times d}$$

$$\text{BiLSTM}(Q_{proj}) = Q_{ind} \in \mathbb{R}^{m \times d} \quad \text{Equation 3}$$

BiLSTM 330 generates an output at each time step i as $h_i$ as the concatenation of $h_i^{\rightarrow}$ and $h_i^{\leftarrow}$ according to Equation 4, where x is the input to biLSTM 330 and LSTM corresponds to a long-term short-term memory network. In some examples, BiLSTM 330 uses a dropout of 0.2 on inputs.

$$h_i^{\rightarrow} = \text{LSTM}(x_i, h_{i-1}^{\rightarrow})$$

$$h_i^{\leftarrow} = \text{LSTM}(x_i, h_{i+1}^{\leftarrow}) \quad \text{Equation 4}$$

Alignment. The outputs $C_{ind}$ and $Q_{ind}$ of biLSTM 330 are used to generate coattended representations $C_{proj}$, $Q_{proj}$, $C_{sum}$, $Q_{sum}$, $C_{coa}$, and $Q_{coa}$ using a coattention network 340. Coattention network 340 first aligns the encoded representations of the context and question sequences. In some examples, because some tokens from the question or the context sequence might not align well with any tokens in the other of the question and context sequences, a separate trained, dummy embedding is added to each of $C_{ind}$ and $Q_{ind}$, which are now in $\mathbb{R}^{(l+1) \times d}$ and $\mathbb{R}^{(m+1) \times d}$.

Coattention network 340 then generates normalized dot-product similarity scores between each of the encoded tokens for the question and the context according to Equation 5, where softmax(X) denotes a column-wise softmax that normalizes each column of the matrix X to have entries that sum to 1.

$$\text{softmax}(C_{ind}Q_{ind}^T) = S_{cq} \in \mathbb{R}^{(l \times 1) \times (m+1)}$$

$$\text{softmax}(Q_{ind}C_{ind}^T) = S_{qc} \in \mathbb{R}^{(m+1) \times (l+1)} \quad \text{Equation 5}$$

Dual Coattention. Coattention network 340 then uses the normalized dot-product similarity scores $S_{cq}$ and $S_{qc}$ as weights to determine summaries of the information from the context and question sequences that is relevant to each token in the other of the context and question sequences according to Equation 6.

$$S_{cq}^T C_{ind} = C_{sum} \in \mathbb{R}^{(m+1) \times d}$$

$$S_{qc}^T Q_{ind} = Q_{sum} \in \mathbb{R}^{(l \times 1) \times d} \quad \text{Equation 6}$$

Coattention network 340 then uses the coattended representations $C_{sum}$ and $Q_{sum}$ along with the use the normalized dot-product similarity scores $S_{cq}$ and $S_{qc}$ to transfer information gained from the alignments back to the original sequences according to Equation 7.

$$S_{qc}^T C_{sum} = C_{coa} \in \mathbb{R}^{(l+1) \times d}$$

$$S_{cq}^T Q_{sum} = Q_{coa} \in \mathbb{R}^{(m \times 1) \times d} \quad \text{Equation 7}$$

The first column of the coattended representations $C_{coa}$ and $Q_{coa}$ correspond to the dummy embeddings previously added. Because this information is not needed, coattention network 340 drops that column of the matrices to get $C_{coa} \in \mathbb{R}^{l \times d}$ and $Q_{coa} \in \mathbb{R}^{m \times d}$.

Compression. Two biLSTMs 350 and 355 are used to compress the outputs from coattention network 340 in two separate groups. The outputs from coattention network 340 are concatenated into two groups, with each group being processed by biLSTMs 350 and 355, respectively, according to Equations 8 and 9. In some examples, BiLSTMs 350 and 355 use a dropout of 0.2 on inputs.

$$\text{BiLSTM}_{comC}([C_{proj}; C_{ind}; Q_{sum}; C_{coa}]) = C_{com} \in \mathbb{R}^{l \times d} \quad \text{Equation 8}$$

$$\text{BiLSTM}_{comQ}([Q_{proj}; Q_{ind}; C_{sum}; Q_{coa}]) = Q_{com} \in \mathbb{R}^{m \times} \quad \text{Equation 9}$$

Self-Attention. The outputs $C_{com}$ and $Q_{com}$ of biLSTMs 350 and 355 are then passed to encoder portions of respective multi-layer self-attention based transformers. More specifically, the $C_{com}$ output of biLSTM 350 is passed to a self-attention encoder 360 and the output $C_{self1}$ of self-attention encoder 360 is passed to a self-attention encoder 370 to generate an output $C_{self2}$. In parallel, the $Q_{com}$ output of biLSTM 355 is passed to a self-attention encoder 365 and the output $Q_{self1}$ of self-attention encoder 365 is passed to a self-attention encoder 375 to generate an output $C_{self2}$. In some examples, the self-attention encoders 360 and 370 capture long distance dependencies within the context and self-attention encoders 365 and 375 capture long distance dependencies within the question. And although encoder 300 is shown with two self-attention encoders for each of the context and question, encoder 300 may include only a single self-attention encoder or three or more self-attention encoders for one or both of the context and question. Each self-attention encoder 360, 365, 370, and 375 includes multi-head self-attention mechanisms that are followed by a position-wise fully connected feed-forward network along with a residual connection and layer normalization as is described in further detail below with respect to FIGS. 4 and 5.

Figure 4:
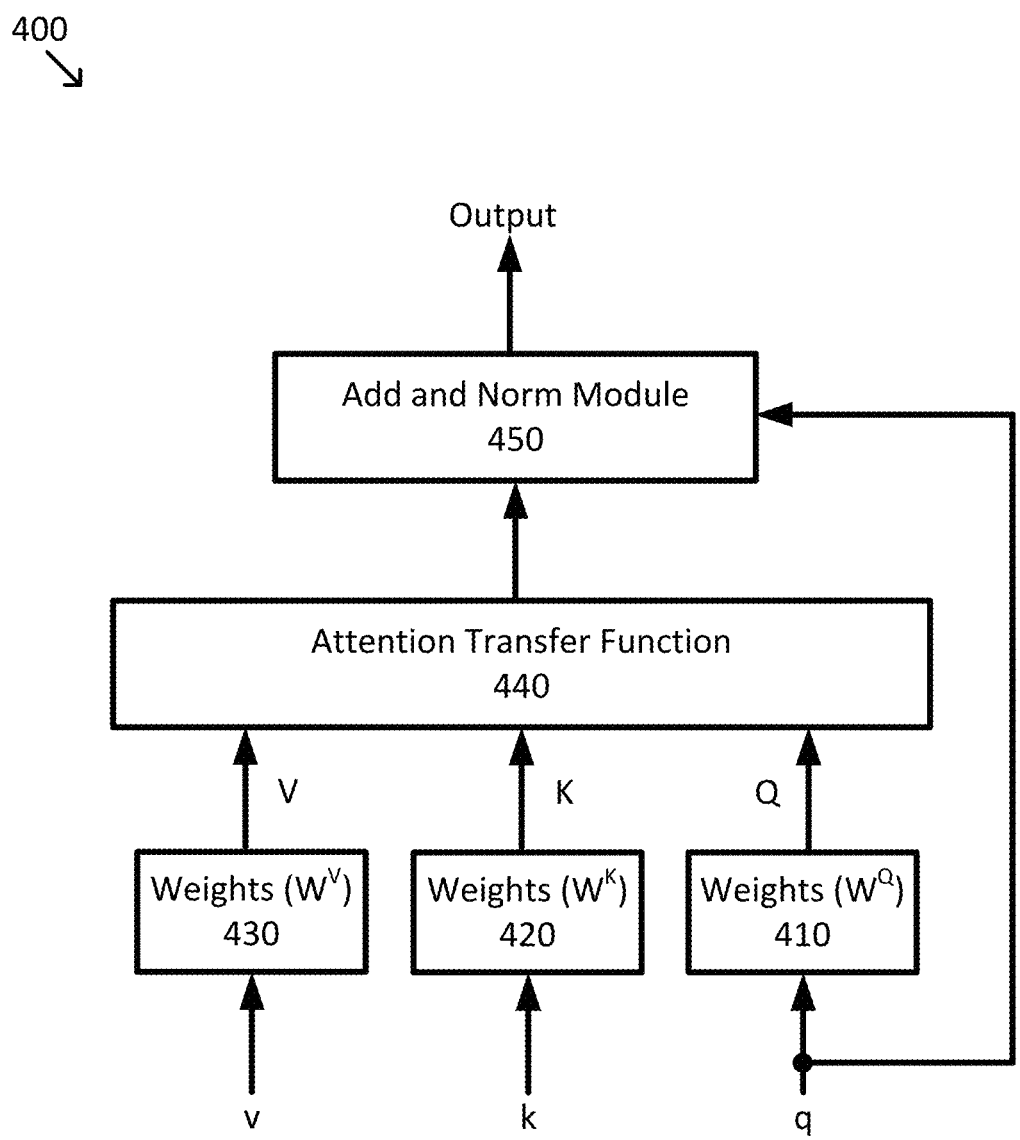
FIG. 4 is a simplified diagram of an attention network according to some embodiments.

FIG. 4 is a simplified diagram of an attention network 400 according to some embodiments. As shown in FIG. 4, attention network 400 receives a query $q \in \mathbb{R}^{d_q}$, a key $k \in \mathbb{R}^{d_k}$, and a value $v \in \mathbb{R}^{d_v}$. Each of the q, k, and v are subject to respective weights $W^Q$ 410, $W^K$ 420, and $W^V$ 430 according to Equation 10. The weights $W^Q$ 410, $W^K$ 420, and $W^V$ 430 are altered during training using back propagation.

$$Q = qW^Q \in \mathbb{R}^{d_q}$$

$$K = kW^K \in \mathbb{R}^{d_k}$$

$$V = vW^V \in \mathbb{R}^{d_v} \quad \text{Equation 10}$$

The resulting Q, K, and V vectors are passed through an attention transfer function 440, which generates a dot product of Q and K, which is then applied to V according to Equation 11.

$$\text{Attention}(Q, K, V) = \text{softmax}\left(\frac{QK^T}{\sqrt{d_k}}\right) V \in \mathbb{R}^{d_v} \quad \text{Equation 11}$$

An addition and normalization module 450 is then used to combine the query q with the output from the attention transfer function to provide a residual connection that improves the rate of learning by attention network 400. Addition and normalization module 450 implements Equation 12 where μ and σ are the mean and standard deviation, respectively, of the input vector and $g_i$ is gain parameter for scaling the layer normalization. The output from addition and normalization module 450 is the output of attention network 400.

$$LayerNorm(\text{Attention}(Q, K, V) + q)$$

$$LayerNomr(a_i) = g_i \frac{a_i - \mu}{\sigma} \quad \text{Equation 12}$$

Attention network 400 is often used in two variant forms. The first variant form is a multi-head attention network where multiple attention networks consistent with attention network 400 are implemented in parallel, which each of the "heads" in the multi-head attention network having its own weights $W^Q$ 410, $W^K$ 420, and $W^V$ 430, which are initialized to different values and thus trained to learn different encodings. The outputs from each of the heads are then concatenated together to form the output of the multi-head attention network. The second variant form is a self-attention network that is a multi-head attention network where the q, k, and v inputs are the same for each head of the attention network.

Self-attention based layers are further described in Vaswani, et al., "Attention is All You Need," arXiv preprint arXiv:1706.03762, submitted Jun. 12, 2017, which is hereby incorporated by reference in its entirety.

Figure 5:
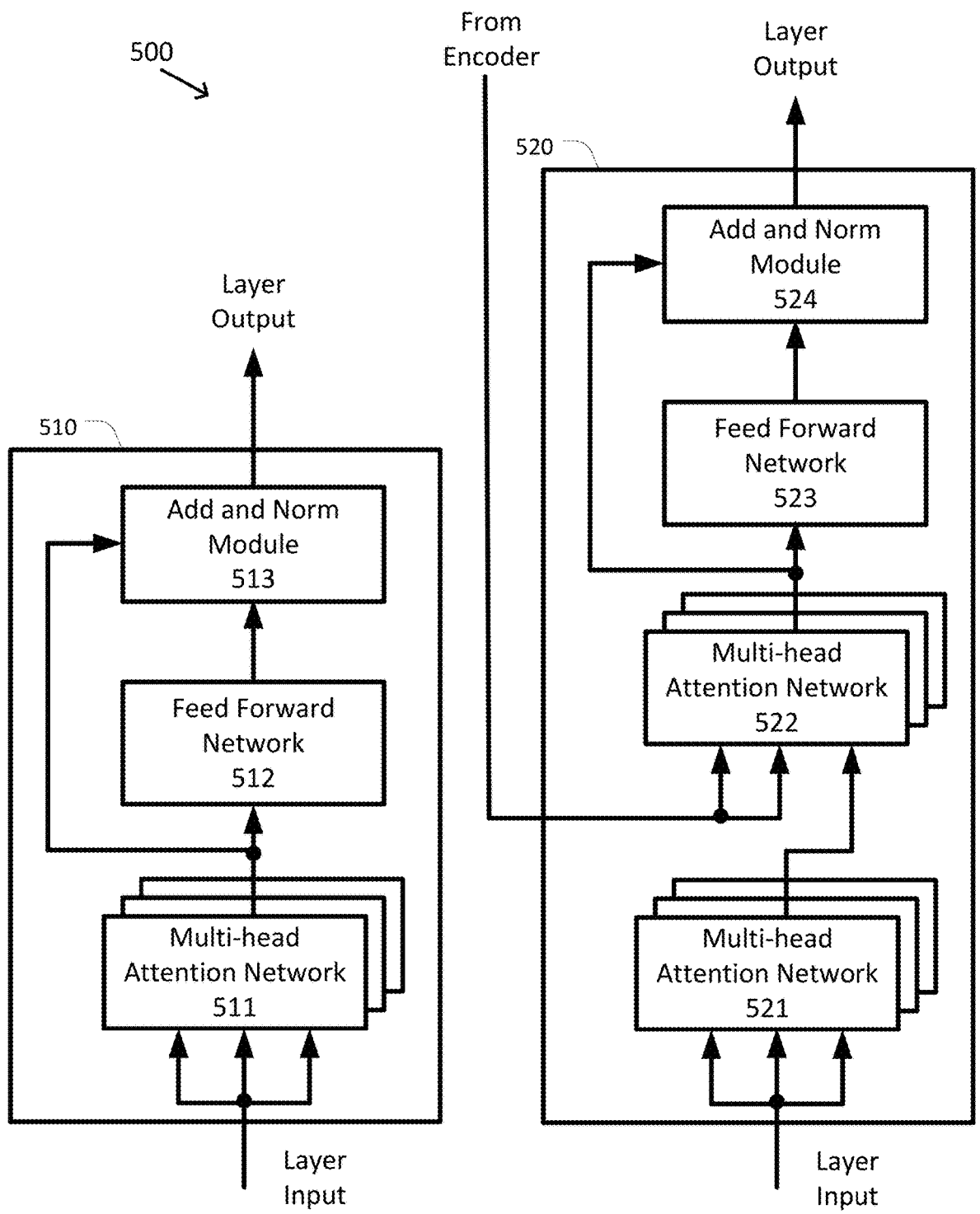
FIG. 5 is a simplified diagram of a layer for an attention-based transformer network according to some embodiments.

FIG. 5 is a simplified diagram of a layer 500 for an attention-based transformer network according to some embodiments. As shown in FIG. 5, layer 500 includes an encoder 510 and a decoder 520.

Encoder 510 receives layer input (e.g., from an input network for a first layer in an encoding stack or from layer output of a next lowest layer for all other layers of the encoding stack) and provides it to all three (q, k, and v) inputs of a multi-head attention network 511, thus multi-head attention network 511 is configured as a self-attention network. Each head of multi-head attention network 511 is consistent with attention network 400. In some examples, multi-head attention network 511 includes three heads, however, other numbers of heads such as two or more than three are possible. In some examples, each attention network has a dimension of 200 and a hidden size of 128. The output of multi-head attention network 511 is provided to a feed forward network 512 with both the input and output of feed forward network 512 being provided to an addition and normalization module 513, which generates the layer output for encoder 510. In some examples, feed forward network 512 is a two-layer perceptron network with a rectified linear unit (ReLU) activation, which implements Equation 13 where $\gamma$ is the input to feed forward network 512 and $M_i$ and $b_i$ are the weights and biases respectively of each of the layers in the perceptron network. In some examples, addition and normalization module 513 is substantially similar to addition and normalization module 450.

$$FF(\gamma)=\max(0, \gamma M_1+b_1)M_2+b_2 \quad \text{Equation 13}$$

Decoder 520 receives layer input (e.g., from an input network for a first layer in a decoding stack or from layer output of a next lowest layer for all other layers of the decoding stack) and provides it to all three (q, k, and v) inputs of a multi-head attention network 521, thus multi-head attention network 521 is configured as a self-attention network. Each head of multi-head attention network 521 is consistent with attention network 400. In some examples, multi-head attention network 521 includes three heads, however, other numbers of heads such as two or more than three are possible. The output of multi-head attention network 511 is provided as the q input to another multi-head attention network 522 and the k and v inputs of multi-head attention network 522 are provided with the output from the encoder. Each head of multi-head attention network 521 is consistent with attention network 400. In some examples, multi-head attention network 522 includes three heads, however, other numbers of heads such as two or more than three are possible. In some examples, each attention network has a dimension of 200 and a hidden size of 128. The output of multi-head attention network 522 is provided to a feed forward network 523 with both the input and output of feed forward network 523 being provided to an addition and normalization module 524, which generates the layer output for encoder 510. In some examples, feed forward network 523 and addition and normalization module 524 are substantially similar to feed forward network 512 and addition and normalization module 513, respectively.

Referring back to FIG. 3, each of self-attention encoders 360, 365, 370, and/or 375 are consistent with encoder 510 and generate self-attention based encodings according to Equation 14, where SAEncode(X) corresponds to the encoding performed by encoder 510 and X corresponds to the input received by multi-head attention network 511.

$$SAEncode(C_{com})=C_{self1}\in\mathbb{R}^{l\times d}$$

$$SAEncode(C_{self1})=C_{self2}\in\mathbb{R}^{l\times d}$$

$$SAEncode(Q_{com})=Q_{self1}\in\mathbb{R}^{m\times d}$$

$$SAEncode(Q_{self1})=Q_{self2}\in\mathbb{R}^{m\times d} \quad \text{Equation 14}$$

Final Encodings. Final encodings for the context are then generated from the $C_{self2}$ output from self-attention encoder 370 by integrating the context information over time using a BiLSTM 380 according to Equation 15. Similarly, final encodings for the question are then generated from the $Q_{self2}$ output from self-attention encoder 375 by integrating the question information over time using a BiLSTM 385 according to Equation 15. In some examples, BiLSTMs 380 and 385 use a dropout of 0.2 on inputs.

$$BiLSTM_{finC}(C_{self2})=C_{fin}\in\mathbb{R}^{l\times d}$$

$$BiLSTM_{finQ}(Q_{self2})=Q_{fin}\in\mathbb{R}^{m\times d} \quad \text{Equation 15}$$

Figure 6:
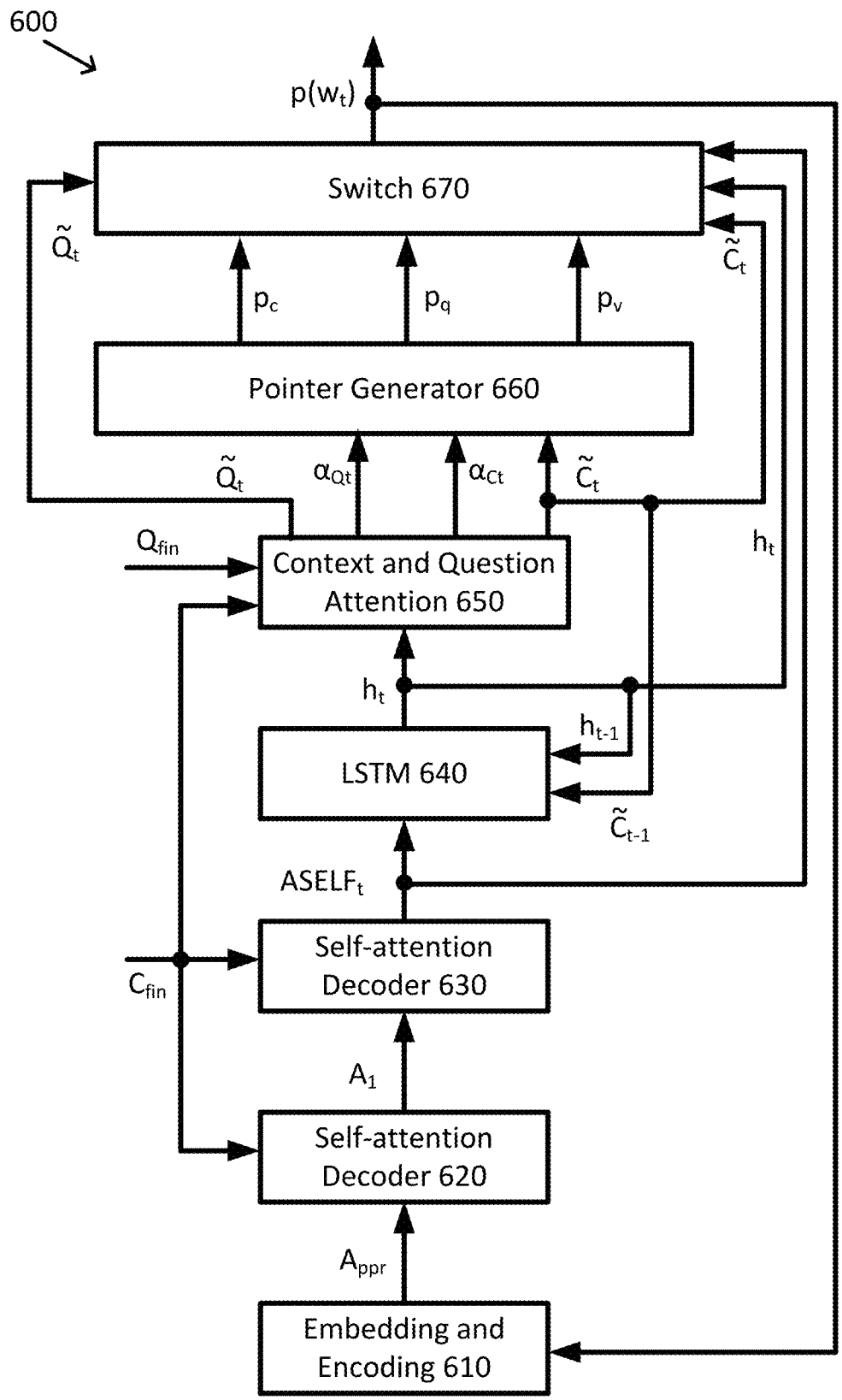
FIG. 6 is a simplified diagram of a decoder according to some embodiments.

FIG. 6 is a simplified diagram of a decoder according to some embodiments. Decoder 600 uses an iterative approach to generate an answer a single word or token at a time. FIG. 6 represents temporal/positional relationships using subscripts that indicate which iteration in the generation of the answer is being referred to. (E.g., $X_t$ refers to the value for X from the t-th iteration and $X_{t-1}$ refers to the value for X from the (t−1)st iteration, that is the iteration previous to the t-th iteration.) As described above with respect to Equation 1, when decoder 600 is used during training, the ground truth answer is initially encoded using the same encoding used for the context and the question.

Answer Representations. An embedding and encoder 610 is used to project the partially formed answer onto a d-dimensional space similar to the embeddings for the context and question according to Equation 16.

$$AW_2+b_2=A_{proj}\in\mathbb{R}^{n\times d} \quad \text{Equation 16}$$

Because the words or tokens in the answer lack both recurrence and convolution, positional encodings PE are added to $A_{proj}$ according to Equation 17.

$$PE[t, k] = \begin{cases} \sin(t/10000^{k/2d}) & k \text{ is even} \\ \cos(t/10000^{(k-1)/2d}) & k \text{ is odd} \end{cases} \quad \text{Equation 17}$$

$$A_{proj} + PE = A_{ppr} \in \mathbb{R}^{n\times d}$$

MultiHead Decoder Attention. The output of embedding and encoder 610 is then passed to a self-attention decoder 620 whose output is then passed to a self-attention decoder 630 to generate ASELF according to Equation 18, where SADecode(A,B) corresponds to the decoding performed by decoder 520, A corresponds to the layer input received by multi-head attention network 521 and B corresponds to the encoding input received by multi-head attention network 522. Self-attention is used so that decoder 600 is aware of previous outputs and attention over the context to prepare for the next word or token to be added to the answer. However, during training and because the decoder operates step by step, appropriate entries of the embedded and encoded ground truth answer are set to a large negative number to prevent decoder 600 from seeing future timesteps when applying Equation 18.

$$SADecode(A_{ppr}, C_{fin})=A_1\in\mathbb{R}^{l\times d}$$

$$SADecode(A_1, C_{fin})=ASELF\in\mathbb{R}^{l\times d} \quad \text{Equation 18}$$

Intermediate Decoder State. A LSTM 640 generates an intermediate state $h_t$ for the current iteration using the previous answer word or token $ASELF_{t-1}$, the context-decoder state $\tilde{c}_{t-1}$ from the previous iteration, and the intermediate state $h_{t-1}$ from the previous iteration according to Equation 19. In some examples, LSTM 640 uses a dropout of 0.2 on inputs.

$$LSTM([ASELF_{t-1}; \tilde{c}_{t-1}], h_{t-1})=h_t\in\mathbb{R}^d \quad \text{Equation 19}$$

Context and Question Attention. The intermediate state $h_t$ from LSTM 640 is provided to a context and question attention network 650 that is first generates attention weights $\alpha_{Ct}$ and $\alpha_{Qt}$ over the final encoding of the context $C_{fin}$ and the final encoding of the question $Q_{fin}$, respectively, according to Equation 20, where $W_2$ and $W_3$ are trainable weight matrices. In some examples, context and question attention network 650 may optionally include trainable biases $b_2$ and $b_3$ within Equation 20. The attention weights allow decoder 600 to focus on encoded information relevant to each iteration t.

$$\text{softmax}(C_{fin}(W_2 h_t)) = \alpha_{C_t} \in \mathbb{R}^l$$

$$\text{softmax}(Q_{fin}(W_3 h_t)) = \alpha_{Q_{W_t}} \in \mathbb{R}^m \quad \text{Equation 20}$$

Recurrent Context State. Context and question attention network 650 then combines the final encoding of the context $C_{fin}$ and the final encoding of the question $Q_{fin}$ as weighted by the attention weights $\alpha_{C_t}$ and $\alpha_{Q_t}$, respectively, with the hidden state $h_t$ according to Equation 21 to generate context representation $\tilde{C}_t$ and question representation $\tilde{Q}_t$, where $W_4$ and $W_5$ are trainable weights and tan h is the hyperbolic tangent transfer function. In some examples, context and question attention network 650 may optionally include trainable biases $b_4$ and $b_5$ within Equation 21. In some examples, other non-linear transfer functions may be used with Equation 21.

$$\tan h(W_4 C_{fin}{}^T \alpha_{C_t}; h_t) = \tilde{C}_t \in \mathbb{R}^d$$

$$\tan h(W_5 Q_{fin}{}^T \alpha_{Q_t}; h_t) = \tilde{Q}_t \in \mathbb{R}^d \quad \text{Equation 21}$$

Multi-Pointer-Generator A pointer generator 660 is used to not only generate distributions over the words or tokens in the context and the words or tokens in the question, but also a distribution over words or tokens v from a generative vocabulary. The distributions assign likelihoods that each of the words or tokens from the context, question, and vocabulary are the next word or token to be selected by decoder 600 in the current iteration t. The distributions are generated according to Equation 22, where $W_v$ is a trainable weight matrix. In some examples, pointer generator 660 may optionally include a trainable bias by within Equation 22 to generate the distribution $p_v$ over the generative vocabulary within Equation 22.

$$\Sigma i: c_{i=W_t}(\alpha_{C_t})_i = p_c(W_t) \in \mathbb{R}^n$$

$$\Sigma i: q_{i=W_t}(\alpha_{Q_t})_i = p_q(W_t) \in \mathbb{R}^m$$

$$\text{softmax}(W_v \tilde{C}_t) = p_v(W_t) \in \mathbb{R}^v \quad \text{Equation 22}$$

Pointer generator 660 then extends the distributions $p_c$, $p_q$, and $p_v$ over the union of the tokens in the context, question, and generative vocabulary by setting missing entries in each distribution to 0 so that each distribution $p_c$, $p_q$, and $p_v$ is in $\mathbb{R}^{l+m \times v}$.

A switch 670 is then used to determine the importance of the context and the question in determining the next word or token for the current iteration according to Equation 23, where σ is a sigmoid transfer function, such as logsig, tansig, and/or the like.

$$\sigma(W_{pv}[\tilde{C}_t h_t; A\text{SELF}_{t-1}]) = \gamma \in [0,1]$$

$$\sigma(W_{eq}[\tilde{Q}_t h_t; A\text{SELF}_{t-1}]) = \lambda \in [0,1] \quad \text{Equation 23}$$

Switch 670 then generates a composite distribution according to Equation 24 and the next word or token for the current iteration is selected based on the word or token from the composite distribution having the greatest likelihood. The selected word or token is then appended to the answer and fed back to embedding and encoder 610 where another iteration of decoder 600 begins. Decoder 600 continues to iterate until a maximum number or words or tokens are selected and/or a sentinel word or token indicating the end of the answer is selected.

$$\gamma P_v(w_t) + (1-\gamma)[\lambda_{p_c}(w_t) + (1+\lambda)p_q(w_t)] = \in \mathbb{R}^{l+m+v} \quad \text{Equation 24}$$

According to some embodiments, during training, encoder 300 and decoder 600 are trained by back propagation using a token-level negative log-likelihood loss function $\mathcal{L}$ over each time-step according to Equation 25, where $a_t$ corresponds to the t-th word or token in the answer.

$$\mathcal{L} = -\Sigma_t^T \log p(a_t) \quad \text{Equation 25}$$

Because the networks of FIGS. 3-6 are used for multiple tasks (e.g., question answering, machine translation, document summarization, database query generation, sentiment analysis, natural language inference, semantic role labeling, relation extraction, goal oriented dialogue, and pronoun resolution) and shares its parameters for the various layers and networks across each of the task types, it may be susceptible to catastrophic forgetting if it is not trained carefully. To address this, in some embodiments, the networks of FIGS. 3-6 may be trained according to a modified joint strategy where the networks of FIGS. 3-6 are trained using an ordering where training samples are presented so as to train the networks of FIGS. 3-6 against a balanced mix of each of the task types concurrently. That is, the order in which training samples are presented to the networks of FIGS. 3-6 selects consecutive training samples or consecutive small groups (e.g., 2-10 or so) training samples from different task types. In some examples, the joint strategy includes selecting a training sample (context c, questions q, and ground truth answer a) from a different one of the task types with each iteration of the training. The goal of the joint strategy is to train against each of the task types concurrently without overly focusing on one task type over another.

Figure 7:
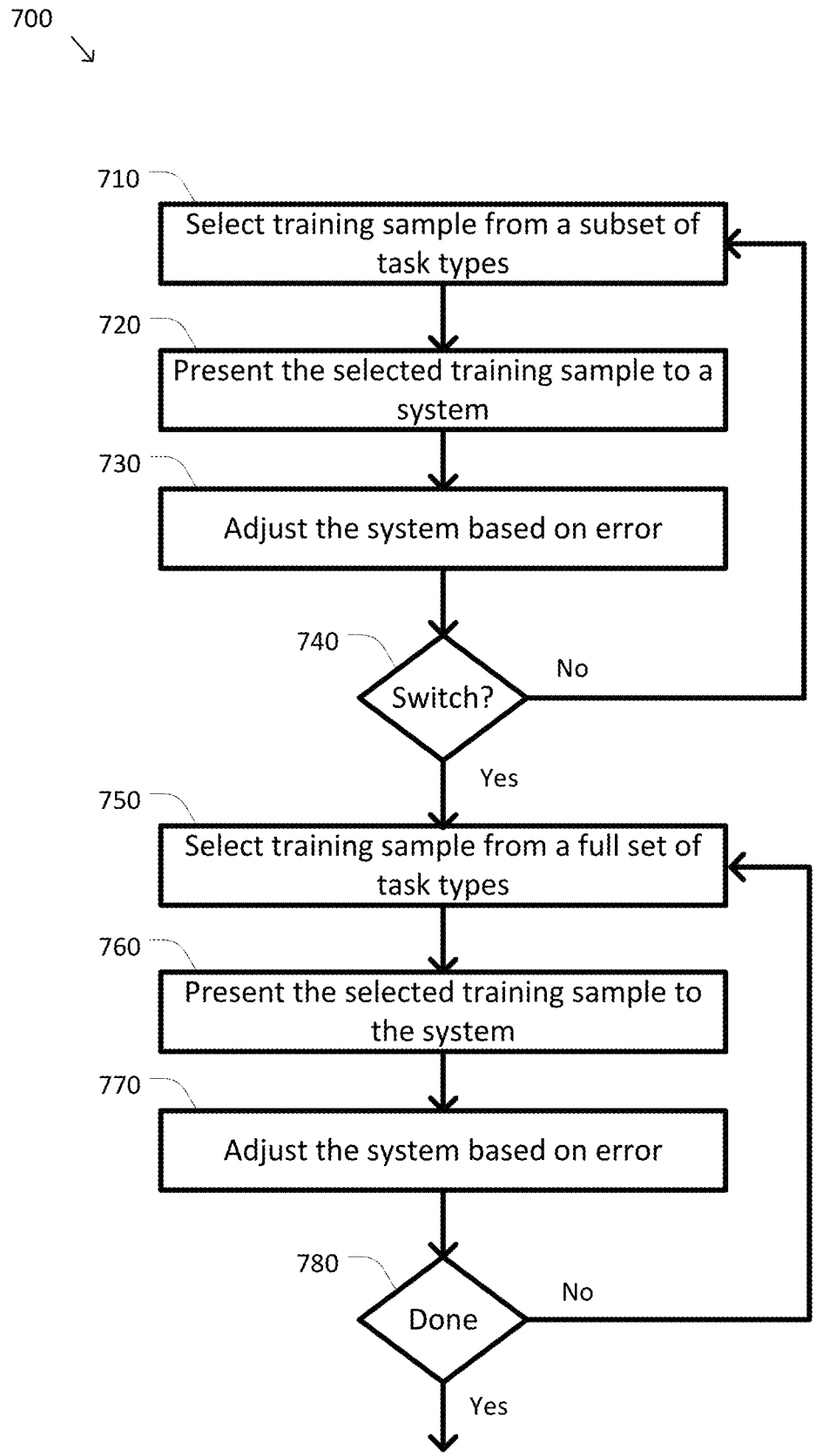
FIG. 7 is a simplified diagram of a method of multitask learning according to some embodiments.

FIG. 7 is a simplified diagram of a method of multitask learning according to some embodiments. One or more of the processes 710-780 of method 700 may be implemented, at least in part, in the form of executable code stored on non-transitory, tangible, machine-readable media that when run by one or more processors may cause the one or more processors to perform one or more of the processes 710-780. In some embodiments, method 700 may be used as a hybrid training strategy for training the networks of FIGS. 3-6, however, method 700 may also be used to train other multitasking systems other than the networks of FIGS. 3-6. In some examples, method 700 may be consistent with a curriculum and/or an anti-curriculum strategy. In some embodiments, the task types trained by method 700 may include any of various natural language processing task types, such as question answering, machine translation, document summarization, database query generation, sentiment analysis, natural language inference, semantic role labeling, relation extraction, goal oriented dialogue, pronoun resolution, and/or the like.

At a process 710, a training sample is selected according to a first training strategy. In some embodiments, the first training strategy is a joint training strategy where training samples are selected from a subset of task types for which the network is being trained. In some examples, the subset of task types may be selected from a full set of task types. In some examples, the full set of task types may include one or more task types selected from question answering, machine translation, document summarization, database query generation, sentiment analysis, natural language inference, semantic role labeling, relation extraction, goal oriented dialogue, pronoun resolution, and/or the like.

In some embodiments, the subset of task types may be selected according to a curriculum strategy where the training sample is selected from those task types whose training converges in a relatively small number of training iterations. In some examples, the subset of task types for the curriculum training may include one or more task types selected from database query generation, sentiment analysis, semantic role labeling, relation extraction, goal oriented dialogue, pronoun resolution, and/or the like.

In some embodiments, the subset of task types may be selected according to an anti-curriculum strategy where the training sample is selected from those task types which are characterized as being more difficult to learn, have longer answer sequences, and/or involve different types of decoding. In some examples, the subset of task types for the anti-curriculum training may include one or more task types selected from question answering, summarization, machine translation, and/or natural language inference.

In some examples, the selected training sample includes a natural language context and a natural language question corresponding to the context and the question, respectively, as well as a ground truth natural language answer.

At a process 720, the selected training sample is presented to a system. In some examples, the system includes encoder 300 and decoder 600. When the training sample is applied to the system it is fed forward through the various layers of the system according to the currently trained parameters (e.g., weights and biases) and an answer is generated. In some examples, the answer is a natural language phrase.

At a process 730, the system is adjusted based on error. The answer generated by the system during process 720 is compared to the ground truth answer for the selected training sample and the error for the selected training sample is determined. The error may then be fed back to the system using back propagation to update the various parameters (e.g., weights and biases) of the layers. In some examples, the back propagation may be performed using the stochastic gradient descent (SGD) training algorithm, the adaptive moment estimation (ADAM) training algorithm, and/or the like. In some examples, the meta parameters of ADAM are set to $(\beta_1, \beta_2, \in = (0.9, 0.98, 10^{-9})$. In some examples, the learning rate is increased linearly from 0 to $2.5 \times 10^{-3}$ for the first 800 iterations before being decayed at $k^{-1/2}$, where k is the iteration count. In some examples, the gradients used for the back propagation may be clipped to 1.0.

At a process 740, it is determined whether to switch from training based on the subset of task types to training based on the full set of task types. In some examples, the decision to switch to the full set of task types occurs after a predetermined number of training samples have been presented. In some examples, the predetermined number of training samples may be 300,000, however, other predetermined numbers of training samples are possible. In some examples, the decision to switch to the full set of task types occurs after each of the training samples for each of the task types in the subset of task types has been selected a predetermined number of times. In some examples, the predetermined number of times may be five, although any other number such as three, four, and/or six or more may also be used. In some examples, one or more other factors may be used to make the determination about when to switch to training using the full set of task types. In some examples, the one or other factors may include monitoring changes in performance metrics for each of the task types in the subset of task types with each pass through the training samples and making the switch when an improvement in each of the performance metrics after each pass improves by less than a threshold amount. When it is determined not to switch to training on the full set of task types, method 700 returns to process 710 where training samples continue to be selected from the subset of task types. When it is determined to switch to training from the full set of task types, selection of the training samples occurs using the full set of task types beginning with a process 750.

At the process 750, a training sample is selected form the full set of task types. In some examples, the full set of task types includes one or more tasks selected from question answering, machine translation, document summarization, database query generation, sentiment analysis, natural language inference, semantic role labeling, relation extraction, goal oriented dialogue, pronoun resolution, and/or the like.

At a process 760, the selected training sample is presented to the system using substantially the same process as process 720.

At a process 770, the system is adjusted based on error using substantially the same process as process 730.

At a process 780, it is determined whether the training is complete. In some examples, training is complete after a predetermined number of training samples have been presented. In some examples, the training is complete after the training samples for each of the task types in the full set of task types has been presented to the system a predetermined number of times. In some examples, the predetermined number of times may be eight, although any other number such as two to seven and/or nine or more may also be used. In some examples, one or more other factors may be used to make the determination about when training is complete. In some examples, the one or other factors may include monitoring changes in performance metrics for each of the task types with each pass through the training samples and noting that training is complete when an improvement in each of the performance metrics after each pass improves by less than a threshold amount. When it is determined that training is not complete, method 700 returns to process 740 where training samples continue to be selected from the full set of task types. When it is determined that training is complete, method 700 ends and the trained system may now be used for any of the tasks for which it is trained.

After training is complete, the trained system may be used for any of the task types using a process substantially similar to process 720 and/or 760 where a context c and a question q may be presented to the system and fed forward through the various layers of the system according to the parameters (e.g., weights and biases) trained according to method 700. The generated answer then corresponds to the response to the presented context c and question q.

FIG. 8 is a simplified diagram of a summary of training sets according to some embodiments. More specifically, FIG. 8 shows each task type, the dataset used, the number of training samples in the dataset, the number of samples in the development/validation samples in the dataset, the number of test samples in the dataset, and the performance metric used.

Training samples for the question answering task type are based on the Stanford Question Answering Dataset (SQuAD), which includes training samples based on questions related to paragraph samples from Wikipedia articles. The performance metric used for the question answering task type is the normalized F1 (nF1) score.

Training samples for the machine translation task type are based on the International Workshop on Spoken Language Translation English to German (IWSLT EN→DE) training set, which contains sentence pairs transcribed from TED talks. The performance metric used for the machine translation task type is the BLEU score.

Training samples for the summarization task type are selected from the CNN daily mail (CNN/DM) training set. The performance metric used for the summarization task type is the ROUGE score.

Training samples for the natural language interference task type are selected from the Multi-genre Natural Language Inference Corpus (MNLI) training set. The performance metric used for the natural language inference task type is the normalized F1 (nF1) score.

Training samples for the sentiment analysis task type are based on the Stanford Sentiment Treebank (SST). The SST includes training samples based on movie reviews and their sentiment. The performance metric used for the sentiment classification task type is the normalized F1 (nF1) score.

Training samples for the semantic role labeling task type are selected from the Question-Answer Semantic Role Labeling (QA-SRL) training set. The performance metric used for the semantic role labeling task type is the normalized F1 (nF1) score.

Training samples for the relationship extraction task type are selected from the Question-Answer Zero-shot Relation Extraction (QA-ZRE) training set. The performance metric used for the relationship extraction task type is the F1 score.

Training samples for the goal oriented dialog task type are selected from the Wizard of Oz (WOZ) training set. The performance metric used for the goal oriented dialog task type is the exact match (EM) score.

Training samples for the database query generation task type are selected from the WikiSQL training set. The performance metric used for the database query generation task type is the exact match (EM) score.

Training samples for the pronoun resolution task type are selected from the Modified Winograd Schema Challenge (MWSC) training set. The performance metric used for the pronoun resolution task type is the normalized F1 (nF1) score.

Figures 9, 11:
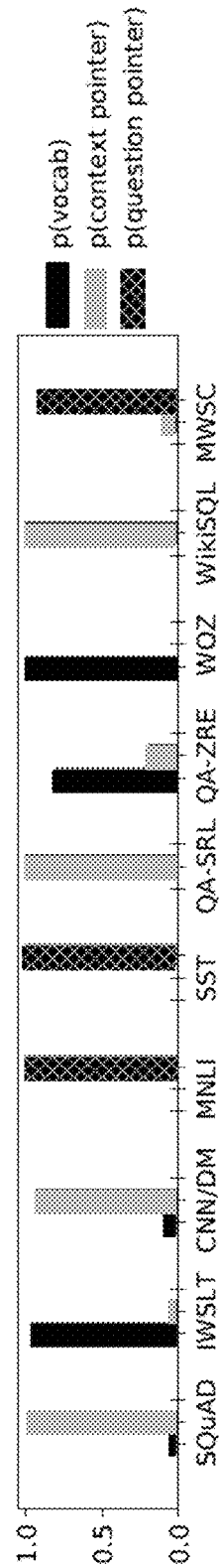
FIG. 9 is a simplified diagram of results from single task and multitask learning according to some embodiments.
FIG. 11 is a simplified diagram of source for word selection for answers according to some embodiments.

FIG. 9 is a simplified diagram of results from single task and multitask learning according to some embodiments. More specifically, FIG. 8 shows the results of training systems, such as encoder 300 and decoder 600, against various task types including question answering, machine translation, document summarization, database query generation, sentiment analysis, natural language inference, semantic role labeling, relation extraction, goal oriented dialogue, pronoun resolution.

Results of the training are further evaluated according to the composite Decathlon Score (decaScore). The decaScore includes an additive combination of the task-specific performance metrics. Because each of the individual performance metrics fall between 0 and 100, the decaScore falls between 0 and 1000 for a composite performance score across the ten task types.

The single-task training columns of FIG. 9 show the baseline results for each of the task types against their respective performance metrics when trained in isolation using the pointer generator sequence-to-sequence model (S2S) of See, et al. "Get to the Point: Summarization with Pointer-generator Networks," arXiv preprint arXiv: 1704.04368, 2017; a version of S2S where the lower layers of S2S are replaced with self-attentive encoder and decoder layers (w/SAtt) of Vaswani, et al., "Attention is All You Need," arXiv preprint arXiv:1706.03762, 2017; a version of S2S augmented with a coattention mechanism (+CAtt) that builds representations of both the context and question separately and explicitly models how the two should interact; and a variation of +CAtt with a question pointer added (+QPtr).

The multitask training columns of FIG. 9 further shows the results of training each of the models using a joint training strategy where training samples are selected from each of the task types throughout the training. A further result (+ACurr) of training of encoder 300 and decoder 600 using an anti-curriculum version of the training of method 700 where the initial subset of task types includes only training samples from the question answering (SQuAD) training set. As FIG. 8 indicates, the anti-curriculum training of method 700 using encoder 300 and decoder 600 yields better overall composite results (as measured by the decaScore) for each of these models.

FIG. 10 is a simplified diagram of results for different training strategies according to some embodiments. More specifically, FIG. 10 shows the differences between training encoder 300 and decoder 600 using a fully joint (Fully Joint) strategy; using method 700 employing a curriculum based approach where the subset of task types are limited to database query generation, sentiment analysis, semantic role labeling, relation extraction, goal oriented dialogue, and pronoun resolution (Curriculum); and using method 700 employing an anti-curriculum based approach where the subset of task types are limited to question answering (SQuAD), question answering, machine translation, and summarization (+IWSLT+CNN/DM), and question answering, machine translation, summarization, and natural language inference (+MNLI). As shown the curriculum-based variation of method 700 did not perform as well as the fully joint strategy. However, the use of method 700 with an anti-curriculum approach using only question answering training samples in the initial subset (SQuAD) showed an overall improvement over the fully joint strategy and an improvement or slight degradation against each of the task types. Overall improvements in performance did not occur when the subset of task types was extended to include training samples from other task types.

FIG. 11 is a simplified diagram of source for word selection for answers according to some embodiments. More specifically, FIG. 11 shows, for each of the task types, which of the context, question, or generative vocabulary is more likely to be the source of the words or tokens selected for the answer based on the $\gamma$ and $\lambda$ values selected by switch 670 and used in Equations 23 and 24. As shown, the sentiment analysis (SST), natural language inference (MNLI), and pronoun resolution (MWSC) task types prefer words or tokens from the question because the question tends to include the classification options for the answer. The machine translation (IWSLT) and goal oriented dialog task types (WOZ) prefer words or tokens from the vocabulary because neither the context nor the question tend to include the desired words for the answer.

Figure 12A:
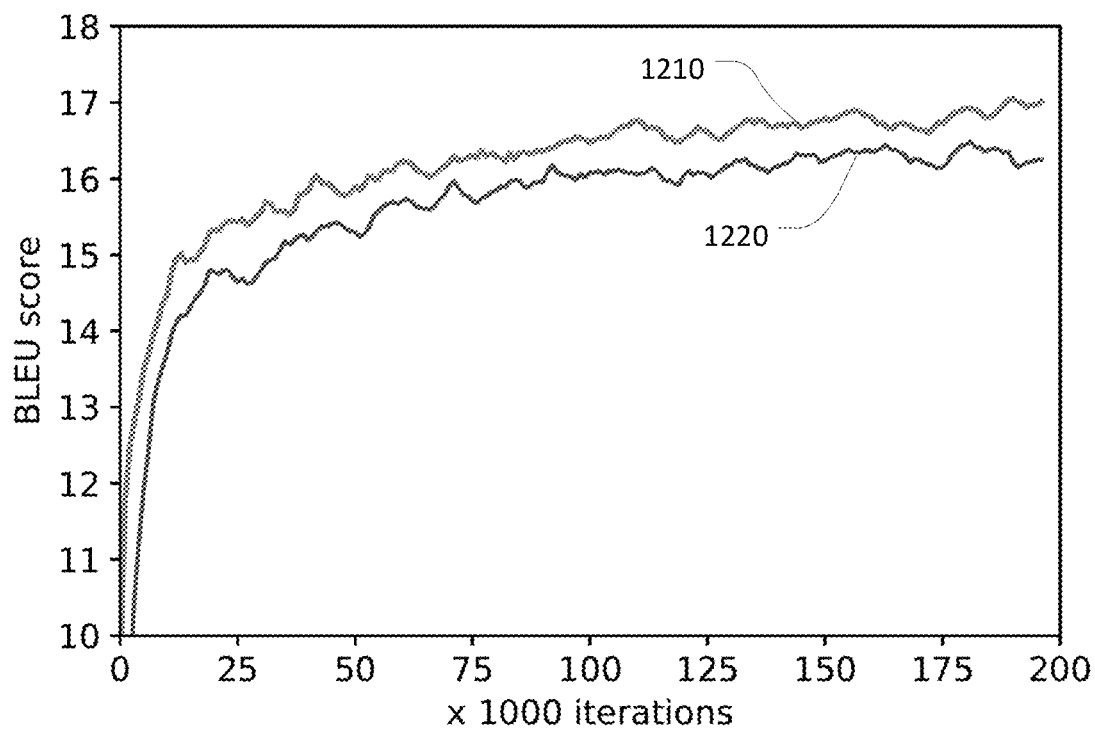
FIGS. 12A and 12B are simplified diagrams of results from different training approaches according to some embodiments.

FIG. 12A is a simplified diagram of results from different training approaches for a new machine translation task type according to some embodiments. More specifically, FIG. 12A shows the results of training against a new machine translation task type using training samples from the IWSLT English to Czech (IWSLT En→Cs) training set using encoder 300 and decoder 600 pre-trained according to method 700 (curve 1210) in comparison to encoder 300 and decoder 600 trained from a random start against only the IWSLT English to Czech training samples (curve 1220).

Figure 12B:
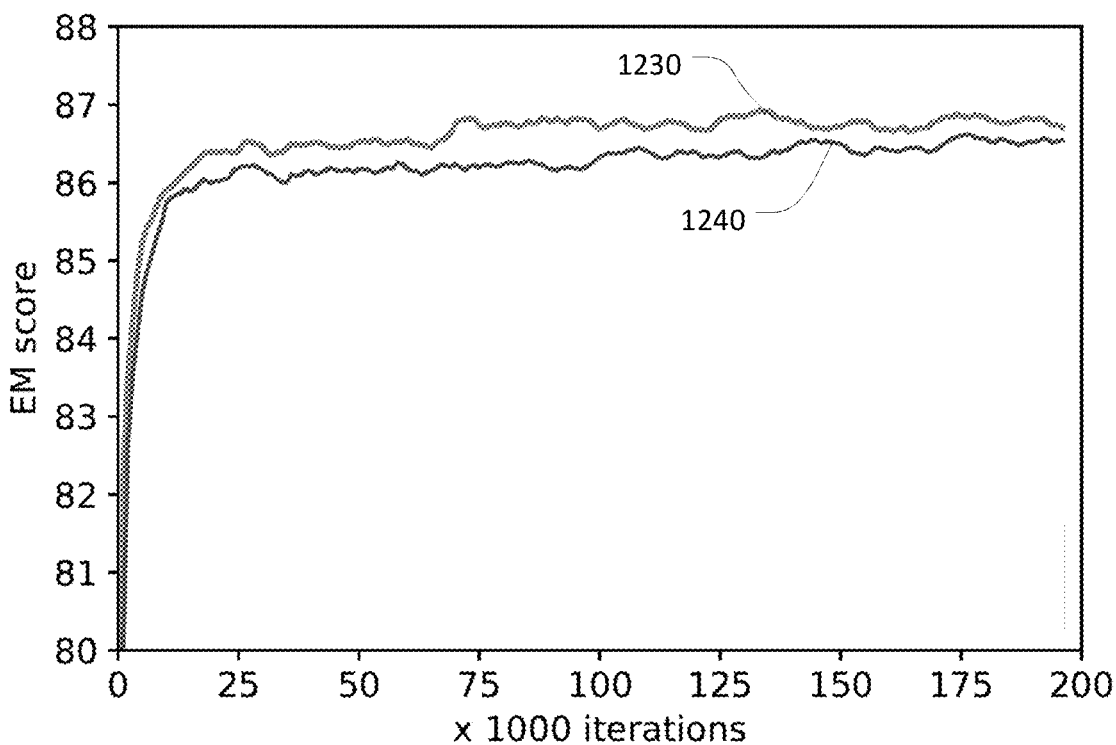

FIG. 12B is a simplified diagram of results from different training approaches for a new classification task according to some embodiments. More specifically, FIG. 12B shows the results of training against a new named entity recognition (NER) task type training samples using encoder 300 and decoder 600 pre-trained according to method 700 (curve 1230) in comparison to encoder 300 and decoder 600 trained from a random start against only the NER training samples (curve 1240).

As shown, the pretraining using method 700 (curves 1210 and 1230) demonstrate better performance results than single task training (curves 1220 and 1240), thus demonstrating the advantages of using the multitask training of method 700 to pretrain for natural language processing tasks and additionally for adapting an already trained network based on encoder 300 and decoder 600 against new tasks.

Some examples of computing devices, such as computing device 200 may include non-transitory, tangible, machine readable media that include executable code that when run by one or more processors (e.g., processor 210) may cause the one or more processors to perform the processes of method 700 and/or emulate the structures of FIGS. 3-6. Some common forms of machine readable media that may include the processes of method 700 and the emulations of FIGS. 3-6 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for natural language processing, the method comprising:

encoding first words from a context and second words from a question, wherein the question is separate from but related to the context, the encodings performed in parallel using a multi-layer encoder;

decoding the encoded context and the encoded question using a multi-layer decoder;

generating, based on an output from the decoder, a first distribution over the first words from the context, a second distribution over the second words from the question, and a third distribution over third words in a generative vocabulary that comprises a source of words;

generating a first weight of the first distribution, a second weight of the second distribution, and a third weight of the third distribution;

generating a composite distribution based on the first weight, second weight, and third weight;

selecting words for inclusion in an answer using the composite distribution; and training the multi-layer encoder and the multi-layer decoder against a subset of task types, wherein the subset of task types are selected according to an anti-curriculum strategy.

2. The method of claim 1, wherein the context and the question correspond to a natural language processing task type selected from question answering, machine translation, document summarization, database query generation, sentiment analysis, natural language inference, semantic role labeling, relation extraction, goal oriented dialogue, and pronoun resolution.

3. The method of claim 1, further comprising:
determining a coattention between the first words in the context and the second words in the question.

4. The method of claim 1, further comprising:
generating an attention across the context and an attention across the question in parallel; and
generating final encodings of the context and the question in parallel based on the attention.

5. The method of claim 1, further comprising:
encoding the words in the context and words in the question in parallel;
projecting the encodings of the words in the context and the words in the question in parallel; and
further encoding the projections of the encodings.

6. The method of claim 1, further comprising:
encoding and embedding an intermediate version of the answer;
generating an attention between the encoded and embedded intermediate version of the answer and a final encoding of the context;
generating an intermediate decoder state from the generated attention; and
generating context and question decoder states based on a final encoding of the context, a final encoding of the question, and the intermediate decoder state.

7. The method of claim 1, wherein the method further comprises training the multi-layer decoder and the multi-layer encoder against a full set of task types after the system is trained against the subset of task types.

8. A non-transitory machine-readable medium comprising executable code which when executed by one or more processors associated with a computing device are adapted to cause the one or more processors to perform a method comprising:

encoding first words from a context and second words from a question, wherein the question is separate from but related to the context, the encodings performed in parallel using a multi-layer encoder;

decoding the encoded context and the encoded question using a multi-layer decoder;

generating, based on an output from the decoder, a first distribution over the first words from the context, a second distribution over the second words from the question, and a third distribution over third words in a generative vocabulary that comprises a source of words;

generating a first weight of the first distribution, a second weight of the second distribution, and a third weight of the third distribution generating a composite distribution based on the first weight, second weight, and third weight; and selecting words for inclusion in an answer using the composite distribution; and training the multi-layer encoder and the multi-layer decoder against a subset of task types, wherein the subset of task types are selected according to an anti-curriculum strategy.

9. The non-transitory machine-readable medium of claim 8, wherein the context and the question correspond to a natural language processing task type selected from question answering, machine translation, document summarization, database query generation, sentiment analysis, natural language inference, semantic role labeling, relation extraction, goal oriented dialogue, and pronoun resolution.

10. The non-transitory machine-readable medium of claim 8, wherein the method further comprises:
determining a coattention between the first words in the context and the second words in the question.

11. The non-transitory machine-readable medium of claim 8, wherein the method further comprises:
generating an attention across the context and an attention across the question in parallel; and
generating final encodings of the context and the question in parallel based on the attention.

12. The non-transitory machine-readable medium of claim 8, wherein the method further comprises:
encoding the words in the context and words in the question in parallel;
projecting the encodings of the words in the context and the words in the question in parallel; and
further encoding the projections of the encodings.

13. The non-transitory machine-readable medium of claim 8, wherein the method further comprises:
encoding and embedding an intermediate version of the answer;
generating an attention between the encoded and embedded intermediate version of the answer and a final encoding of the context;
generating an intermediate decoder state from the generated attention; and
generating context and question decoder states based on a final encoding of the context, a final encoding of the question, and the intermediate decoder state.

14. A system for natural language processing, the system comprising:
a memory storing instructions; and
a processor coupled with the memory and configured, when executing the instructions on the memory, to cause the system to:
encode first words from a context and second words from a question, wherein the question is separate from but related to the context, the encodings performed in parallel;
decode the encoded context and the encoded question;
generate, based on the decoded context and the decoded question, a first distribution over the first words from the context, a second distribution over the second words from the question, and a third distribution over third words in a generative vocabulary that comprises a source of words;
generate a first weight of the first distribution, a second weight of the second distribution, and a third weight of the third distribution;
generate a composite distribution based on the first weight, second weight, and third weight; and
select words for inclusion in an answer using the composite distribution,
wherein the system is trained against a subset of task types, and
wherein the subset of task types are selected according to an anti-curriculum strategy.

15. The system of claim 14, wherein the context and the question correspond to a natural language processing task type selected from question answering, machine translation, document summarization, database query generation, sentiment analysis, natural language inference, semantic role labeling, relation extraction, goal oriented dialogue, and pronoun resolution.

16. The system of claim 14, wherein the processor is further configured to determine a coattention between the first words in the context and the second words in the question.

17. The system of claim 14, wherein the processor is further configured to:
generate an attention across the context and an attention across the question in parallel; and
generate final encodings of the context and the question in parallel based on the generated attention.

18. The system of claim 14, wherein the processor is further configured to:
encode the words in the context and words in the question in parallel;
project the encodings of the words in the context and the words in the question in parallel; and
further encode the projections of the encodings.

19. The system of claim 14, wherein the processor is further configured to:
encode and embed an intermediate version of the answer;
generate an attention between the encoded and embedded intermediate version of the answer and a final encoding of the context;
generate an intermediate decoder state from the generated attention; and
generate context and question decoder states based on a final encoding of the context, a final encoding of the question, and the intermediate decoder state.

20. The system of claim 14, wherein the system is further trained against a full set of task types that the system is designed to process after the system is trained against the subset of task types.

* * * * *